United States Patent
Wu et al.

(10) Patent No.: US 11,434,354 B2
(45) Date of Patent: Sep. 6, 2022

(54) COMPOSITIONS AND MULTILAYER FILMS FOR RECLOSABLE PACKAGING

(71) Applicants: Dow Global Technologies LLC, Midland, MI (US); Rohm and Haas Company, Collegeville, PA (US)

(72) Inventors: Xiaosong Wu, Freeport, TX (US); Chuan-Yar Lai, Houston, TX (US); Daniel W. Himmelberger, Collegeville, PA (US); Vivek Kalihari, Freeport, TX (US); Cristina Serrat, Freeport, TX (US); Vinita Yadav, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/640,474

(22) PCT Filed: Sep. 19, 2018

(86) PCT No.: PCT/US2018/051661
§ 371 (c)(1),
(2) Date: Feb. 20, 2020

(87) PCT Pub. No.: WO2019/060362
PCT Pub. Date: Mar. 28, 2019

(65) Prior Publication Data
US 2020/0216649 A1 Jul. 9, 2020

Related U.S. Application Data

(60) Provisional application No. 62/562,040, filed on Sep. 22, 2017.

(51) Int. Cl.
| C08L 23/08 | (2006.01) |
| B32B 27/08 | (2006.01) |
| B32B 27/30 | (2006.01) |
| B32B 27/32 | (2006.01) |
| C08L 53/02 | (2006.01) |

(52) U.S. Cl.
CPC .......... *C08L 23/0815* (2013.01); *B32B 27/08* (2013.01); *B32B 27/302* (2013.01); *B32B 27/32* (2013.01); *C08L 53/02* (2013.01); *B32B 2307/31* (2013.01); *B32B 2439/40* (2013.01); *C08L 2203/162* (2013.01)

(58) Field of Classification Search
None
See application file for complete search history.

(56) References Cited

U.S. PATENT DOCUMENTS

| 3,578,239 A | 5/1971 | Perlman |
| 3,645,992 A | 2/1972 | Clayton |
| 3,914,342 A | 10/1975 | Mitchell |
| 3,915,302 A | 10/1975 | Farrelly et al. |
| 4,076,698 A | 2/1978 | Anderson et al. |
| 5,040,904 A | 8/1991 | Cornwell |
| 5,172,854 A | 12/1992 | Epstein et al. |
| 5,272,236 A | 12/1993 | Lai et al. |
| 5,278,272 A | 1/1994 | Lai et al. |
| 5,582,923 A | 12/1996 | Kale et al. |
| 5,691,052 A | 11/1997 | Jones |
| 5,733,155 A | 3/1998 | Sagawa |
| 5,844,045 A | 12/1998 | Kolthammer et al. |
| 5,882,749 A | 3/1999 | Jones et al. |
| 5,882,789 A | 3/1999 | Jones et al. |
| 6,481,183 B1 | 11/2002 | Schmidt |
| 6,918,532 B2 | 7/2005 | Sierra-Gomez et al. |
| 7,638,152 B1 | 12/2009 | Jurgovan et al. |
| 8,329,276 B2 | 12/2012 | Cruz |
| 8,440,293 B2 | 5/2013 | Yasuike |
| 8,497,330 B2 | 7/2013 | Hussein et al. |

(Continued)

FOREIGN PATENT DOCUMENTS

| CN | 102660069 A | 8/2016 |
| EP | 343629 A1 | 11/1989 |

(Continued)

OTHER PUBLICATIONS

Paul—hot-melt adhesives—tackifiers—MRS Bulletin 2003 (Year: 2003).*
Dow Engage 8100 polyolefin elastomer—datasheet—2011 (Year: 2011).*
Technical Datasheet for Engage 8842 Dow Chemical (Year: 2011).*
Technical Datasheet for Kraton G1657 (Year: 2019).*
Office Action dated May 4, 2021 pertaining to U.S. Appl. No. 16/640,498, filed Feb. 20, 2020, 29 pgs.
Shalaby et al. "Thermal Characterization of Polymeric Materials", 2nd edition, Academic Press, 1997, E. Turi ed., pp. 277 and 278.
International Search Report and Written Opinion pertaining to PCT/US2018/051661, dated Dec. 14, 2018.

(Continued)

*Primary Examiner* — Robert T Butcher
(74) *Attorney, Agent, or Firm* — Dinsmore & Shohl LLP

(57) ABSTRACT

The present disclosure includes a composition that includes an ethylene/α-olefin random copolymer having density of 0.890 g/cm$^3$ or less, a melting point of 100° C. or less, and a melt index from 0.2 g/10 min to 8.0 g/10 min, a styrenic block copolymer comprising from 1 wt % to less than 50 wt % units of styrene, a tackifier, and an oil. The composition may exhibit an overall melt index of the composition of from 2 g/10 min to 15 g/10 min. The composition can be used as an adhesive in some embodiments. The present disclosure also includes multilayer films that include the composition, which may provide reclose functionality to the multilayer film. The multilayer films that include the composition may provide low initial opening force and improved reclose adhesion through multiple reclose cycles. The present disclosure also includes various types of reclosable packaging articles that include the multilayer films and adhesive compositions.

14 Claims, 9 Drawing Sheets

(56) References Cited

U.S. PATENT DOCUMENTS

| | | |
|---|---|---|
| 8,541,081 B1 | 9/2013 | Ranganathan et al. |
| 8,617,677 B2 | 12/2013 | Trouilhet et al. |
| 9,586,724 B2 | 3/2017 | Moehlenbrock et al. |
| 2004/0054097 A1 | 3/2004 | Maehling et al. |
| 2004/0077759 A1 | 4/2004 | Bardiot et al. |
| 2005/0031233 A1 | 2/2005 | Varanese et al. |
| 2006/0251342 A1 | 11/2006 | Forman |
| 2007/0078222 A1 | 4/2007 | Chang et al. |
| 2007/0104395 A1 | 5/2007 | Kinigakis et al. |
| 2011/0021103 A1* | 1/2011 | Alper ............... B32B 27/32 442/329 |
| 2012/0259050 A1 | 10/2012 | Vitrano et al. |
| 2013/0266243 A1 | 10/2013 | Kinigakis et al. |
| 2014/0256867 A1 | 9/2014 | Puerkner et al. |
| 2016/0168433 A1 | 6/2016 | Himmelberger et al. |
| 2016/0230000 A1 | 8/2016 | Gu |
| 2017/0362468 A1 | 12/2017 | D'Haese et al. |
| 2018/0057218 A1 | 3/2018 | O'Hagan |

FOREIGN PATENT DOCUMENTS

| | | | |
|---|---|---|---|
| EP | 1180534 A1 | 2/2002 | |
| EP | 1180534 A1 * | 2/2002 | .......... C08L 23/0815 |
| EP | 2361760 A1 | 8/2011 | |
| EP | 2551211 A1 | 1/2013 | |
| FR | 2783512 A1 | 3/2000 | |
| FR | 2816952 A1 | 5/2002 | |
| GB | 1107200 A | 3/1968 | |
| GB | 2337243 A | 11/1999 | |
| GB | 2339187 A | 1/2000 | |
| JP | 2002017365 A | 1/2002 | |
| WO | 0226579 A1 | 4/2002 | |
| WO | 02064694 A1 | 8/2002 | |
| WO | 03010057 A1 | 2/2003 | |
| WO | 2010046623 A2 | 4/2010 | |
| WO | 2016159928 A1 | 10/2016 | |
| WO | 2016196000 A1 | 12/2016 | |

OTHER PUBLICATIONS

International Search Report and Written Opinion pertaining to PCT/US2018/051932, dated Nov. 26, 2018.

International Search Report and Written Opinion pertaining to PCT/US2018/052108, dated Nov. 30, 2018.

International Search Report and Written Opinion pertaining to PCT/US2018/052200, dated Nov. 30, 2018.

Presto Products Company, Fresh-Lock® Soft Seal® Zippers, Product Data, retrieved Feb. 20, 2020, https://fresh-lock.com/product-list/fresh-lock-soft-seal-zippers/.

Office Action dated Oct. 1, 2020 pertaining to U.S. Appl. No. 16/640,537, filed Feb. 20, 2020, 17 pgs.

Office Action dated Nov. 2, 2020 pertaining to U.S. Appl. No. 16/640,518, filed Feb. 20, 2020, 25 pgs.

Office Action dated Mar. 19, 2021 pertaining to U.S. Appl. No. 16/640,537, filed Feb. 20, 2020, 15 pgs.

Chinese Office Action dated Dec. 9, 2021, pertaining to Chinese Patent Application No. 201880057123.5, 8 pgs.

* cited by examiner

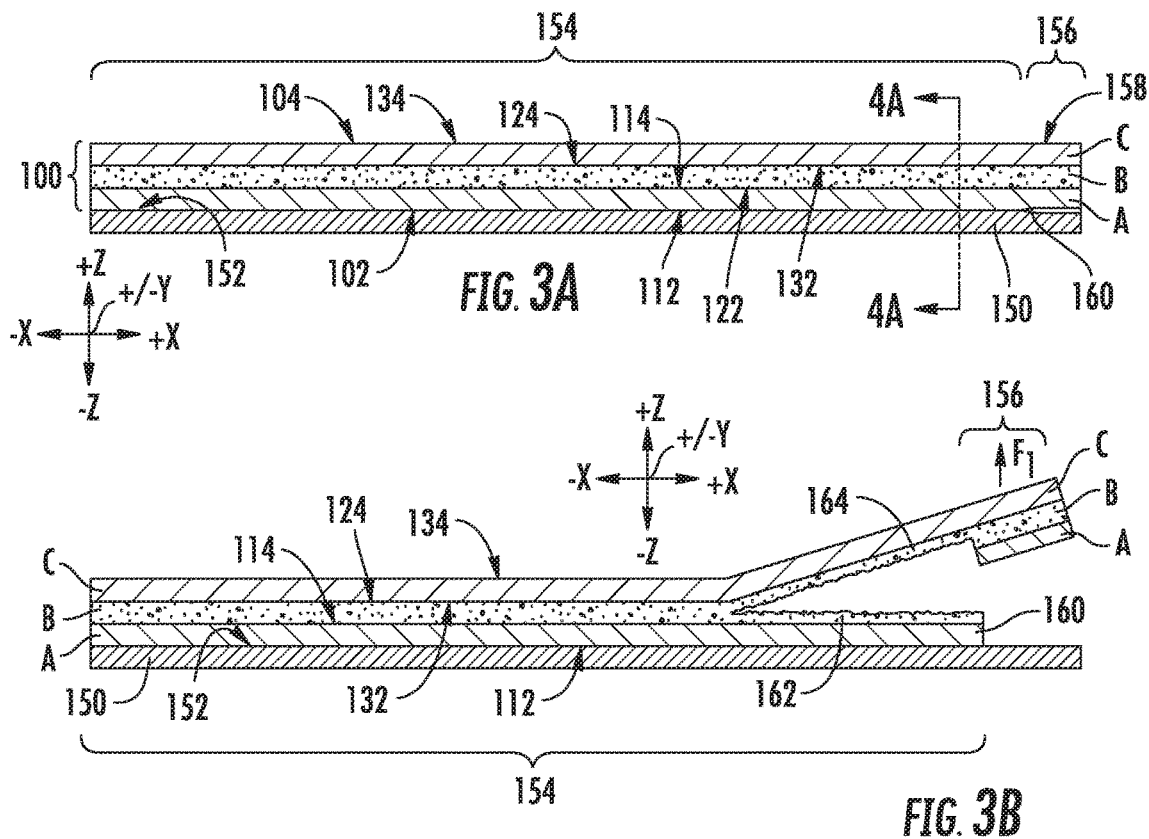
FIG. 3A
FIG. 3B
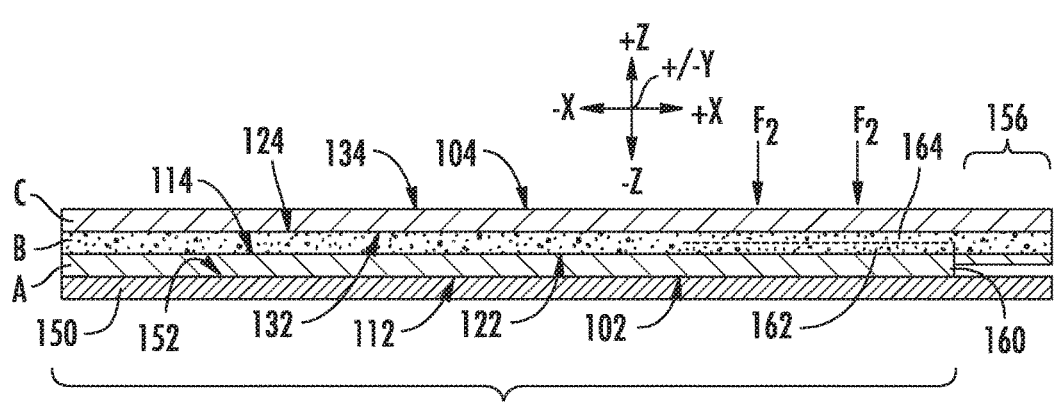
FIG. 3C
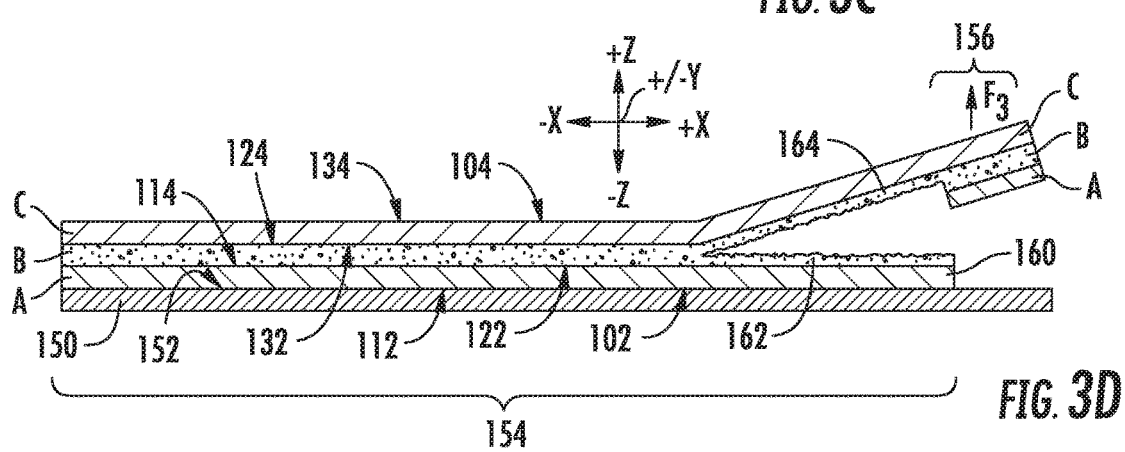
FIG. 3D

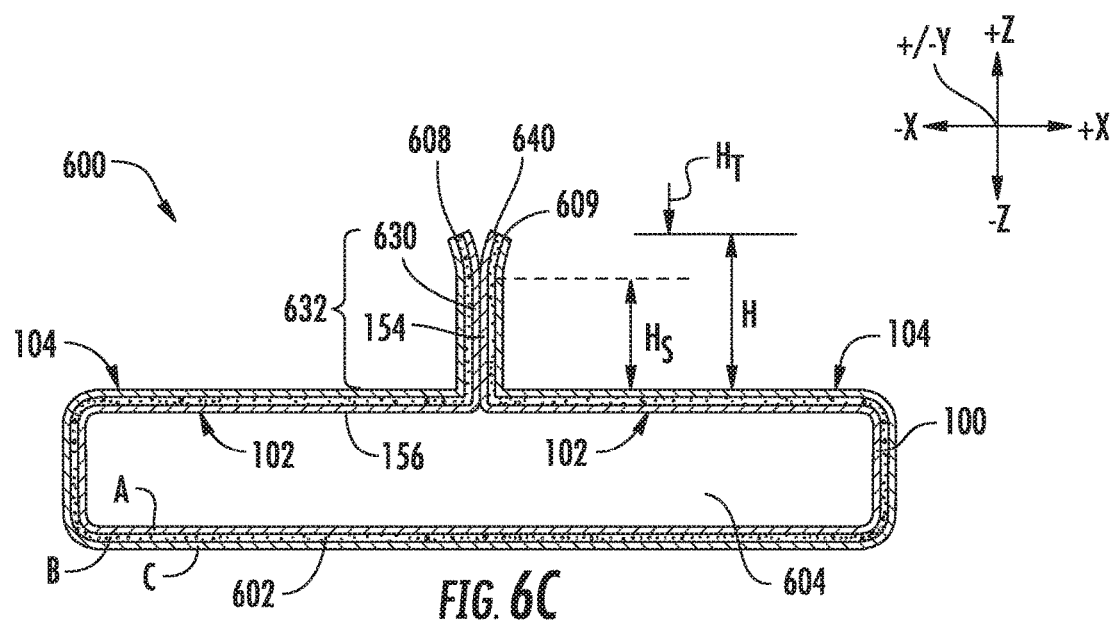
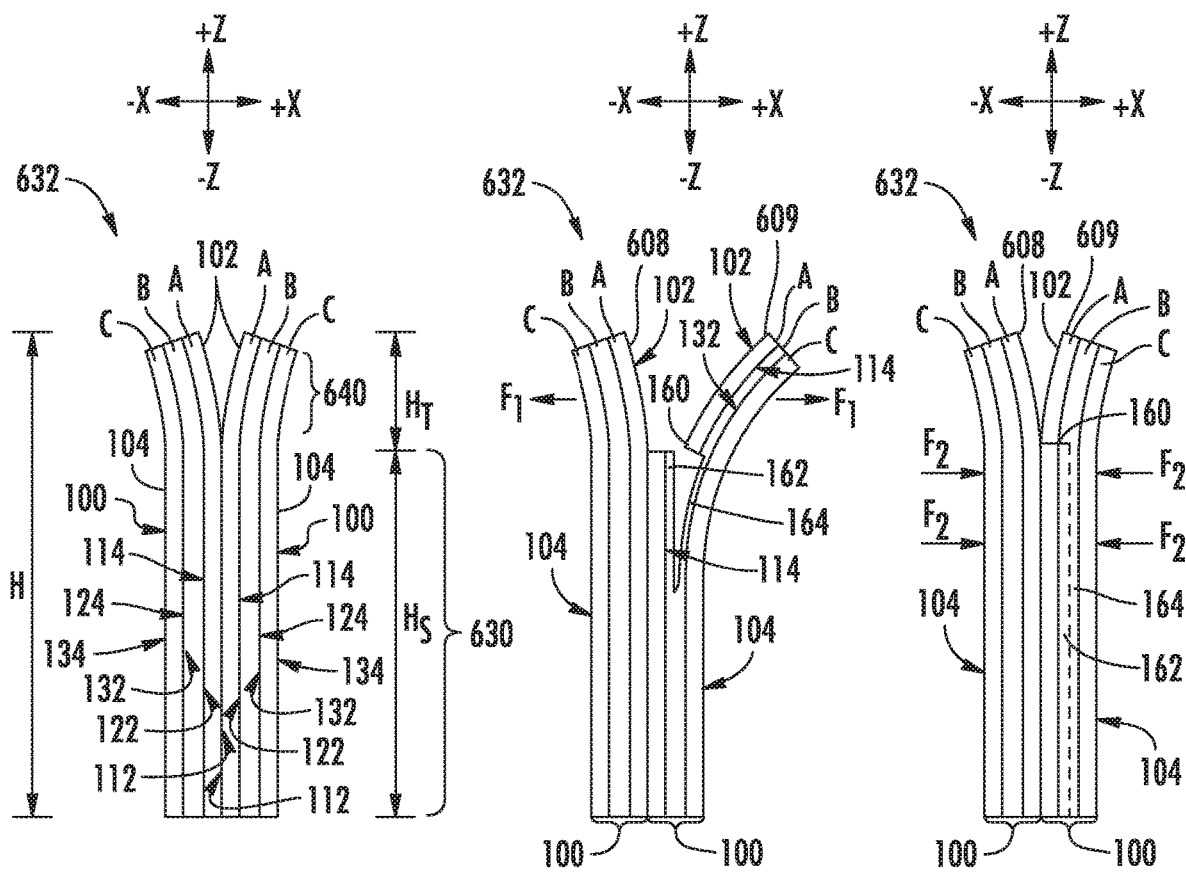

COMPOSITIONS AND MULTILAYER FILMS FOR RECLOSABLE PACKAGING

CROSS-REFERENCE TO RELATED APPLICATIONS

This application is a National Stage Entry under 35 U.S.C. § 371 of International Patent Application No. PCT/US2018/051661, filed Sep. 19, 2018, which claims priority to U.S. Provisional Patent Application No. 62/562,040, filed Sep. 22, 2017, the contents of both of which are hereby incorporated by reference in their entirety.

TECHNICAL FIELD

Embodiments of the present disclosure generally relate to compositions, reclosable multilayer films that include the compositions, and reclosable packaging articles that include the compositions or the multilayer films.

BACKGROUND

Convenience is a growing trend in the food packaging industry, with consumers looking for packaging that can be easily handled and used. Reclosability in flexible packaging not only offers consumer convenience, but also provides longer shelf life of the packed product without the need to transfer contents into separate reclose packages, such as a zippered plastic bags or rigid containers with lids, for example. Conventional reclose systems are limited in availability and have shortcomings such as additional fabrication steps or poor processability. Conventional reclose packages are usually coated water based acrylics and require lamination, die-cutting, or other secondary processing steps. Hot melt adhesives based on styrenic block copolymers (SBC) eliminate some of the processing steps needed for coated adhesives, but are difficult to process and may impart an odor and/or taste to contents of the package.

SUMMARY

Accordingly, ongoing needs exist for a composition and multilayer films that include the composition that provide reclosability (reclose/reopen functionality) to packaging and that, in some embodiments, is safe for food packaging applications and does not impart an odor to the contents of the reclosable packaging. A need further exists for a composition that is extrudable to produce the multilayer films. A need further exists for a composition that provides improved bond strength upon reclosing the multilayer film while maintaining an initial bond strength low enough to enable the multilayer film to be easily opened initially to activate the reclose/reopen functionality.

One or more of these needs are met by various embodiments of the compositions of the present disclosure. The compositions may be adhesive compositions, such as extrudable pressure sensitive adhesive compositions that provide reclose/reopen functionality to multilayer films made therewith. The composition includes an ethylene/alpha-olefin random copolymer, less than 50 wt. % of a styrenic block copolymer, a tackifier, and an oil. The composition can be extruded to produce multilayer films that include the composition. The multilayer films may be included in packaging to provide reclose/reopen functionality to the packaging.

According to one or more embodiments, a composition may include (a) an ethylene/α-olefin random copolymer having density of 0.890 g/cm3 or less, a melting point of 100° C. or less, and a melt index from 0.2 g/10 min to 8.0 g/10 min; (b) a styrenic block copolymer comprising from greater than 1 wt % to less than 50 wt % units of styrene; (c) a tackifier; and (d) an oil. The composition may be an adhesive composition. The composition may exhibit an overall melt index of the composition of from 2 g/10 min to 15 g/10 min.

According to one or more other embodiments, a multilayer film may include at least 3 layers, each having opposing facial surfaces. The 3 layers of the multilayer film may include a layer A, a layer B, and a Layer C. Layer A may include a sealant layer, and Layer B may include the composition of any of the embodiments disclosed herein. A top facial surface of Layer B may be in adhering contact with a bottom facial surface of Layer A. Layer C may include a polyolefin, and a top facial surface of Layer C may be in adhering contact with a bottom facial surface of Layer B. In some embodiments, an article may include the compositions of any other embodiments of the present disclosure. The articles may further include the multilayer films of any other embodiments of the present disclosure.

According to yet other embodiments, a package includes a substrate and a multilayer film that includes at least 3 layers, each layer having opposing facial surfaces. A Layer A comprises a sealant layer. A Layer B may include a composition comprising an ethylene/α-olefin random copolymer having a density less than or equal to 0.890 g/cm3, a melting point of less than or equal to 100° C., and a melt index of from 0.2 g/10 min to 8.0 g/10 min; a styrenic block copolymer comprising from greater than 1 wt. % to less than 50 wt. % units of styrene; a tackifier; and an oil. A Layer C may include a polyolefin or a sealant. A top facial surface of Layer B may be in adhering contact with a bottom facial surface of Layer A, and a top facial surface of Layer C may be in adhering contact with a bottom facial surface of Layer B. The package may include at least one sealing region in which at least a portion of a top facial surface of Layer A is in adhering contact with at least one surface of the substrate to form a seal between the multilayer film and the substrate.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 3A schematically depicts a cross-sectional view of the multilayer film of FIG. 1 adhered to a substrate, in accordance with one or more embodiments of the present disclosure;

FIG. 3B schematically depicts a cross-sectional view of the multilayer film of FIG. 3A in which the multilayer film has been initially opened to activate the reclose functionality of the multilayer film, in accordance with one or more embodiments of the present disclosure;

FIG. 3C schematically depicts a cross-sectional view of the multilayer film of FIG. 3B in which the multilayer film has been reclosed following initial opening of the multilayer film, in accordance with one or more embodiments of the present disclosure;

FIG. 3D schematically depicts a cross-sectional view of the multilayer film of FIG. 3C in which the multilayer film has been reopened after being reclosed, in accordance with one or more embodiments of the present disclosure;

FIG. 6C schematically depicts a cross-sectional view of the pouch package of FIG. 6A taken along reference line 6C-6C in FIG. 6A, in accordance with one or more embodiments of the present disclosure;

FIG. 7A schematically depicts a cross-sectional view of a fin seal and tab of the pouch package of FIG. 6C, in accordance with one or more embodiments of the present disclosure;

FIG. 7B schematically depicts a cross-sectional view of the fin seal and tab in FIG. 7A in which the fin seal has been initially opened to activate the reclose/reopen functionality of the multilayer film, in accordance with one or more embodiments of the present disclosure;

FIG. 7C schematically depicts a cross-sectional view of the fin seal and tab in FIG. 7B in which the fin seal has been reclosed, in accordance with one or more embodiments of the present disclosure;

DETAILED DESCRIPTION

Figure 1:
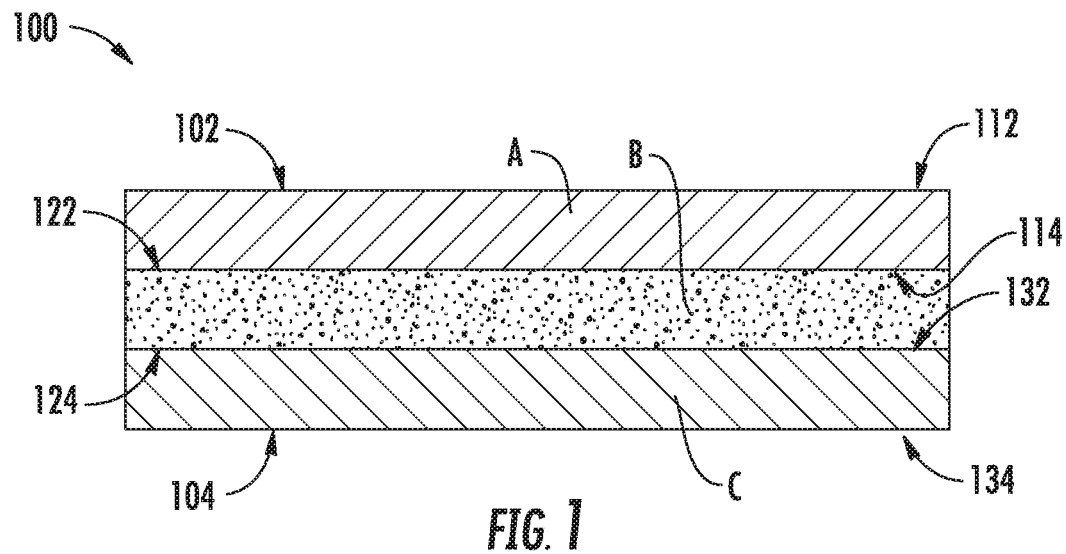
FIG. 1 schematically depicts a cross-sectional view of a multilayer film that includes 3 layers, in accordance with one or more embodiments of the present disclosure.

Embodiments of the present disclosure are directed to compositions, multilayer films that include the compositions, and reclosable packaging made from the multilayer films having the compositions disclosed herein.

As used herein, melt index ($I_2$) is a measure of the extrusion flow rate of a polymer and is generally measured using ASTM D1238 at a temperature of 190° C. and 2.16 kg of load.

As used herein, the Molecular Weight Distribution (MWD) of a polymer is defined as the quotient Mw/Mn, where Mw is a weight average molecular weight of the polymer and Mn is a number average molecular weight of the polymer.

The term "polymer" refers to a polymeric compound prepared by polymerizing monomers, whether of the same or a different type. The generic term polymer thus embraces the term "homopolymer" usually employed to refer to polymers prepared from only one type of monomer as well as "copolymer" which refers to polymers prepared from two or more different monomers. The term "block copolymer" refers to a polymer comprising two or more chemically distinct regions or segments (referred to as "blocks"). In some embodiments, these blocks may be joined in a linear manner, that is, a polymer comprising chemically differentiated units which are joined end-to-end. A "random copolymer" as used herein comprises two or more polymers where each polymer may comprise a single unit or a plurality of successive repeat units along the copolymer chain back bone. Even though some of the units along the copolymer chain backbone exist as single units, these are referred to as polymers herein.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). As used herein, "ethylene/α-olefin random copolymer" is a random copolymer comprising greater than 50% by weight of units derived from ethylene monomer The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm.

The term "LLDPE", includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art.

The term "MDPE" refers to polyethylenes having densities from 0.926 to 0.935 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.935 g/cc, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cc, which are generally prepared with Ziegler-Natta catalysts, single-site catalysts including, but not limited to, bis-metallocene catalysts and constrained geometry catalysts, and post-metallocene, molecular catalysts. The term "propylene-based polymer," as used herein, refers to a polymer that comprises, in polymerized form, refers to polymers comprising greater than 50% by weight of units which have been derived from propylene monomer. This includes propylene homopolymer, random copolymer polypropylene, impact copolymer polypropylene, propylene/α-olefin interpolymer, and propylene/α-olefin copolymer. These polypropylene materials are generally known in the art.

As used herein, the term "styrenic block copolymer" refers to a block copolymer that is produced from the polymerization of styrene monomer and at least one other comonomer.

As used herein, a "seal" refers to a closure of two or more items in contact, direct or indirect, that is tight enough to prevent passage of unwanted materials through the point or surface of contact. A seal may be mechanical or chemical in nature. For example, a mechanical seal might consist of two rigid surfaces that are interlocked in such a fashion as to prevent movement of the surfaces and movement between the surfaces, such as zippers, snap lids, or similar devices. Examples of chemical seals include solders, welds, adhesives, or similar substances that use a temperature, pressure, or a combination thereof to introduce a chemical composition that prevents movement of two or more items. The seal encompasses the items in contact, the surface or point of contact, and any other materials that might be at the surface or point of contact. The tightness of a seal may vary; hermetic seals, particle-tight seals, dust-tight seals, water-tight seals, liquid-tight seals, air-tight seals, wet gas-tight seals, or dry gas-tight seals are contemplated.

The compositions disclosed herein include an ethylene/α-olefin random copolymer, a styrenic block copolymer, a tackifier, and an oil. The ethylene/α-olefin random copolymer has a density of 0.890 g/cm$^3$ or less, a melting point of 100° C. or less, and a melt index of from 0.2 grams per 10 minutes (g/10 min) to 8.0 g/10 min. The styrenic block copolymer includes from greater than 1 wt. % to less than 50 wt. % units of styrene. The compositions may have an overall melt index ($I_2$) of from 2 g/10 min to 15 g/10 min. In some embodiments, the compositions may be adhesive compositions. For example, in some embodiments, the compositions may be pressure sensitive adhesive compositions, such as hot melt pressure sensitive adhesives. The compositions may be incorporated into a multilayer film having at least 3 layers. Referring to FIG. 1, Layer A may be a sealant layer, Layer B may include the compositions disclosed herein, and Layer C may include a support material, such as a polyolefin or other support material, for example. Layer B may be positioned proximal to Layer A with a top facial surface of Layer B in adhering contact with a bottom facial surface of Layer A. A top facial surface of Layer C may be in adhering contact with the bottom facial surface of Layer B.

The compositions of Layer B may provide reclose/reopen functionality to the multilayer film. The multilayer film that includes the compositions disclosed herein may exhibit a lower initial cohesive strength which may reduce the amount of force necessary to initially open the multilayer film and packaging made with the multilayer film compared to conventional reclose films. This may make the multilayer film easier to initially open. The multilayer film of the present disclosure may also provide reclose peel adhesion strength after multiple reclose cycles that may be equal to or greater than the reclose peel adhesive of conventional reclose films. The multilayer film that includes the compositions disclosed herein may also maintain acceptable reclose peel adhesion strength over a greater number of reclose cycles compared to conventional reclose films.

Additionally, the compositions may be safe and suitable for use in food packaging applications in some embodiments. Additionally, in some embodiments, the composition does not negatively affect the quality of the packaged contents. For example, some conventional reclosable packages may include compositions that may impart an unpleasant odor to the package contents. In one or more embodiments, composition and multilayer films made with the composition do not affect the aroma, smell, odor, or other olfactory properties of the package contents. The compositions of the present disclosure may include reduced concentrations of styrenic block copolymers compared to conventional reclose films. Therefore, the compositions of the present disclosure and the multilayer films made therewith may provide reclosability to food packaging films without changing the odor or taste of the food packaged in the films in some embodiments.

The ethylene/α-olefin random copolymer of the compositions may be a copolymer of ethylene comonomer and at least one α-olefin comonomer (i.e., alpha olefin comonomer). Suitable α-olefin comonomers may include those containing 3 to 20 carbon atoms ($C_3$-$C_{20}$ α-olefins). In some embodiments, the α-olefin comonomer may be a $C_3$-$C_{20}$ α-olefin, a $C_3$-$C_{12}$ α-olefin, a $C_3$-$C_{10}$ α-olefin, a $C_3$-$C_8$ α-olefin, a $C_4$-$C_{20}$ α-olefin, a $C_4$-$C_{12}$ α-olefin, a $C_4$-$C_{10}$ α-olefin, or a $C_4$-$C_8$ α-olefin. In one or more embodiments, the ethylene/α-olefin random copolymer may be a copolymer of ethylene comonomer and one or more co-monomers selected from propylene, 1-butene, 3-methyl-1-butene, 1-pentene, 3-methyl-1-pentene, 4-methyl-1-pentene, 1-hexene, 1-septene, 1-octene, 1-nonene, 1-decene, 1-dodecene, 1-tetradecene, 1-hexadecene, 1-octadecene, and 1-eicosene. In one or more embodiments, the ethylene/α-olefin random copolymer may be a copolymer of ethylene comonomer and 1-hexene comonomer. In one or more embodiments, the ethylene/α-olefin random copolymer may be an ethylene/octene copolymer that may be made from ethylene comonomer and octene comonomer.

A weight percent of ethylene monomer units in the ethylene/α-olefin random copolymer may be greater than 50 wt. % in one or more embodiments, or greater than or equal to 55 wt. % in other embodiments, or greater than or equal to 60 wt. % in yet other embodiments, or greater than or equal to 65 wt. % in yet other embodiments. In some embodiments, the ethylene/α-olefin random copolymer may include from greater than 50 wt. % to 70 wt. %, from greater than 50 wt. % to 65 wt. %, from greater than 50 wt. % to 60 wt. %, from 55 wt. % to 70 wt. %, from 55 wt. % to 65 wt. %, from 55 wt. % to 60 wt. %, from 60 wt. % to 70 wt. %, from 60 wt. % to 65 wt. %, or from 65 wt. % to 70 wt. % ethylene monomer units. Conversely, a weight percent of the α-olefin comonomer in the first polyethylene resin may be less than 50 wt. % in one or more embodiments, or less than or equal to 45 wt. % in other embodiments, or less than or equal to 40 wt. % in yet other embodiments, or less than or equal to 35 wt. % in yet other embodiments.

The ethylene/α-olefin random copolymer may have a density of less than or equal to 0.890 grams per centimeter cubed (g/cm$^3$). In some embodiments, the ethylene/α-olefin random copolymer may have a density that is less than or equal to 0.880 g/cm$^3$, or even less than 0.87 g/cm$^3$. The density of the ethylene/α-olefin random copolymer is measured in accordance with ASTM D792. In one or more embodiments, the ethylene/α-olefin random copolymer may have a density of from 0.850 g/cm$^3$ to 0.890 g/cm$^3$. In one or more embodiments, the ethylene/α-olefin random copolymer may have a density of from 0.850 g/cm$^3$ to 0.880 g/cm$^3$, from 0.850 g/cm$^3$ to 0.870 g/cm$^3$, from 0.860 g/cm$^3$ to 0.890 g/cm$^3$, or 0.860 g/cm$^3$ to 0.880 g/cm$^3$.

The ethylene/α-olefin random copolymer may have a melting point of less than or equal to 100 degrees Celsius (° C.). For example, in some embodiments, the ethylene/α-olefin random copolymer may have a melting point of less than or equal to 95° C., less than or equal to 90° C., less than or equal to 80° C., or even less than or equal to 75° C. In some embodiments, the ethylene/α-olefin random copolymer may have a melting point of greater than room temperature, such as greater than or equal to 30° C. or even greater than or equal to 40° C. In some embodiments, the ethylene/α-olefin random copolymer may have a melting point of from 30° C. to 100° C., from 30° C. to 95° C., from 30° C. to 90° C., from 30° C. to 80° C., from 30° C. to 75° C., from 40° C. to 100° C., from 40° C. to 95° C., from 40° C. to 90° C., from 40° C. to 80° C., or from 40° C. to 75° C.

The ethylene/α-olefin random copolymer may have a melt index ($I_2$), which is measured according to ASTM D1238 at 190° C. and 2.16 kg load, of from 0.2 grams per 10 minutes (g/10 min) to 8.0 g/10 min, from 0.2 g/10 min to 5.0 g/10 min, from 0.2 g/10 min to 3.0 g/10 min, from 0.2 g/10 min to 1.5 g/10 min, from 0.2 g/10 min to 1.0 g/10 min, from 0.5 g/10 min to 8.0 g/10 min, from 0.5 g/10 min to 5.0 g/10 min, from 0.5 g/10 min to 3.0 g/10 min, from 0.5 g/10 min to 1.5 g/10 min, from 0.5 g/10 min to 1.0 g/10 min, from 1.0 g/10 min to 8.0 g/10 min, from 1.0 g/10 min to 5.0 g/10 min, from 1.0 g/10 min to 3.0 g/10 min, or from 3.0 g/10 min to 8.0 g/10 min. In one or more embodiments, the ethylene/α-olefin random copolymer may have a melt index ($I_2$) of from 0.2 g/10 min to 8.0 g/10 min. In one or more other embodiments, the ethylene/α-olefin random copolymer may have a melt index ($I_2$) of from 0.5 g/10 min to 1.5 g/10 min.

The ethylene/α-olefin random copolymer may have a molecular weight distribution (MWD or Mw/Mn) of from 1.0 to 3.5, from 1.0 to 3.0, from 1.0 to 2.5, from 1.0 to 2.2, from 1.0 to 2.0, from 1.3 to 3.5, from 1.3 to 3.0, from 1.3 to 2.5, from 1.3 to 2.2, from 1.3 to 2.0, from 1.7 to 3.5, from 1.7 to 3.0, from 1.7 to 2.5, from 1.7 to 2.2, or from 1.7 to 2.0. In one or more embodiments, the ethylene/α-olefin random copolymer may have a MWD of from 1.0 to 3.5. Mw is the weight average molecular weight and Mn is the number average molecular weight, both of which may be measured by gel permeation chromatography (GPC).

The dynamic melt viscosity of the ethylene/α-olefin random copolymer may be measured using Dynamic Mechanical Spectroscopy (DMS), which is described subsequently in this disclosure. In some embodiments, the ethylene/α-olefin random copolymer may have a ratio of the dynamic melt viscosity at 0.1 radians per second to the dynamic melt viscosity at 100 radians per second of less than or equal to 20 at a temperature of 110° C. as determined by DMS. In some embodiments, the ethylene/α-olefin random copolymer may have a ratio of the dynamic melt viscosity at 0.1 radians per second to the dynamic melt viscosity at 100 radians per second of less than or equal to 15 at a temperature of 130° C. as determined by DMS. In some embodiments, the ethylene/α-olefin random copolymer may have a ratio of the dynamic melt viscosity at 0.1 radians per second to the dynamic melt viscosity at 100 radians per second of less than or equal to 10 at a temperature of 150° C. as determined by DMS.

The ethylene/α-olefin random copolymer may be made by gas-phase, solution-phase, or slurry polymerization processes, or any combination thereof, using any type of reactor or reactor configuration known in the art, e.g., fluidized bed gas phase reactors, loop reactors, continuous stirred tank reactors, batch reactors in parallel, series, and/or any combinations thereof. In some embodiments, gas or slurry phase reactors are used. In some embodiments, the ethylene/α-olefin random copolymer is made in a gas-phase or slurry process such as that described in U.S. Pat. No. 8,497,330, which is herein incorporated by reference in its entirety. The ethylene/α-olefin random copolymer may also be made by a high pressure, free-radical polymerization process. Methods for preparing the ethylene/α-olefin random copolymer by high pressure, free radical polymerization can be found in U.S. 2004/0054097, which is herein incorporated by reference in its entirety, and can be carried out in an autoclave or tubular reactor as well as any combination thereof. Details and examples of a solution polymerization of ethylene monomer and one or more α-olefin comonomers in the presence of a Ziegler-Natta catalyst are disclosed in U.S. Pat. Nos. 4,076,698 and 5,844,045, which are incorporated by reference herein in their entirety. The catalysts used to make the ethylene/α-olefin random copolymer described herein may include Ziegler-Natta, metallocene, constrained geometry, single site catalysts, or chromium-based catalysts.

Exemplary suitable ethylene/α-olefin random copolymers may include, but may not be limited to, AFFINITY™ EG 8100 ethylene/α-olefin random copolymer and ENGAGE™ 8842 ethylene/α-olefin copolymer supplied by The Dow Chemical Company, Midland, Mich.

The compositions disclosed herein may include from 30 wt. % to 65 wt. % ethylene/α-olefin random copolymer based on the total weight of the composition. For example, in some embodiments, the compositions may include from 30 wt. % to 55 wt. %, from 33 wt. % to 65 wt. %, or from 33 wt. % to 55 wt. % ethylene/α-olefin random copolymer based on the total weight of the composition.

As previously discussed, the compositions include a styrenic block copolymer. The styrenic block copolymer may include from greater than 1 wt. % to less than 50 wt. % styrene. In some embodiments, the styrenic block copolymer may include from 10 wt. % styrene to less than 50 wt. % styrene. The styrene monomer may be styrene or a styrene derivative, such as alpha-methyl styrene, 4-methylstyrene, 3,5-diethylstyrene, 2-ethyl-4-benzylstyrene, 4-phenylstyrene, or mixtures thereof. In one or more embodiments, the styrene monomer is styrene. Various olefin or diolefin (diene) comonomers are contemplated as suitable for polymerizing with the styrene. The olefin comonomer may comprise $C_3$-$C_{20}$ α-olefins. The diolefin comonomers may include various $C_4$-$C_{20}$ olefins such as 1,3-butadiene, 1,3-cyclohexadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene, or combinations thereof.

Examples of suitable styrenic block copolymers may include, but are not limited to, styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Examples of styrenic block copolymers may include, but are not limited to, materials commercially available under the tradename "KRATON" such as KRATON D1161, KRATON D1118, KRATON G1657, and the like, available from Kraton Corp., Houston, Tex. or materials commercially available under the trade name "Vector" such as 4113A, 4114A, 4213A, and the like, available from Dexco Polymers, Houston, Tex.

The styrenic block copolymer includes less than 50 wt. % styrene. For example, in some embodiments, the stryrenic block polymer may include less than or equal to 45 wt. %, less than or equal to 40 wt. %, less than or equal to 35 wt. %, less than or equal to 30 wt. %, or even less than or equal to 25 wt. % styrene. In some embodiments, the styrenic block copolymer may have from greater than or equal to 1 wt. % to less than 50 wt. % styrene. In other embodiments, the styrenic block copolymer may have from 5 wt. % to less than 50 wt. %, from 10 wt. % to less than 50 wt. %, from 15 wt. % to less than 50 wt. %, from 20 wt. % to less than 50 wt. %, from 1 wt. % to 45 wt. %, from 1 wt. % to 40 wt. %, from 1 wt. % to 35 wt. %, from 1 wt. % to 30 wt. %, from 1 wt. % to 25 wt. %, from 5 wt. % to less than 50 wt. %, from 5 wt. % to 45 wt. %, from 5 wt. % to 40 wt. %, from 5 wt. % to 35 wt. %, from 5 wt. % to 30 wt. %, from 5 wt. % to 25 wt. %, from 10 wt. % less than 50 wt. %, from 10 wt. % to 45 wt. %, from 10 wt. % to 40 wt. %, from 10 wt. % to 35 wt. %, from 10 wt. % to 30 wt. %, from 10 wt. % to 25 wt. %, from 15 wt. % to less than 50 wt. %, from 15 wt. % to 45 wt. %, from 15 wt. % to 40 wt. %, from 15 wt. % to 35 wt. %, from 15 wt. % to 30 wt. %, or from 15 wt. % to 25 wt. % styrene. In some embodiments, the styrenic block copolymer including less than 50 wt. % styrene may include an amount of non-styrenic copolymer that is sufficient to interact with the tackifier. In some embodiments, the styrenic block copolymer may be SIS and the styrenic block copolymer may include from 15 wt. % to 25 wt. % styrene. In other embodiments, the styrenic block copolymer may be SIS and may include from 20 wt. % to 25 wt. % styrene.

The compositions disclosed herein may include from 10 wt. % to 35 wt. % styrenic block copolymer based on the total weight of the composition. For example, in some embodiments, the compositions may include from 10 wt. % to 30 wt. % styrenic block copolymer based on the total weight of the composition.

The tackifier may be a resin added to the compositions disclosed herein to reduce the modulus and increase the surface adhesion of the compositions compared to the compositions without the tackifier. In some embodiments, the tackifier may be a hydrocarbon tackifier. The tackifier may include, but is not limited to, non-hydrogenated aliphatic $C_5$ (five carbon atoms) resins, hydrogenated aliphatic $C_5$ resins, aromatic modified $C_5$ resins, terpene resin, hydrogenated $C_9$ resins, or combinations thereof. In some embodiments, the tackifier may be selected from the group consisting of a non-hydrogenated aliphatic $C_5$ resin and a hydrogenated aliphatic $C_5$ resin. In some embodiments, the composition may include a plurality of tackifiers.

In some embodiments, the tackifier may have a density from 0.92 g/cm$^3$ to 1.06 g/cm$^3$. The tackifier may exhibit a Ring and Ball softening temperature of from 80° C. to 140° C., from 85° C. to 130° C., from 90° C. to 120° C., from 90° C. to 110° C., or from 91° to 100° C. The Ring and Ball softening temperature may be measured in accordance with ASTM E 28. In some embodiments, the tackifier may exhibit a melt viscosity of less than 1000 Pascal second (Pa-s) at 175° C. For example, in other embodiments, the tackifier may exhibit a melt viscosity of less than or equal to 500 Pa-s, less than or equal to 200 Pa-s, less than or equal to 100 Pa-s, or even less than or equal to 50 Pa-s at 175° C. Further, in some embodiments, the tackifier may exhibit a melt viscosity greater than or equal to 1 Pa-s or greater than or equal to 5 Pa-s at 175° C. In a some embodiments, the tackifier may exhibit a melt viscosity from 1 Pa-s to less than 100 Pa-s, or to less than 50 Pa-s at 175° C. The melt viscosity of the tackifier may be determined using dynamic mechanical spectroscopy (DMS).

The $C_5$ resin for a "$C_5$ tackifier" may be obtained from $C_5$ feedstocks such as pentenes and piperylene. The terpene resin for a tackifier may be based on pinene and d-limonene feedstocks. Examples of suitable tackifiers may include, but are not limited to, tackifiers sold under the tradename PICCOTAC, REGALITE, REGALREZ, and PICCOLYTE, such as PICCOTAC 1100, PICCOTAC 1095, REGALITE R1090, and REGALREZ 11126, available from The Eastman Chemical Company, and PICCOLYTE F-105 from PINOVA.

The compositions disclosed herein may include from 20 wt. % to 40 wt. % tackifier. In some embodiments, the compositions may have from 20 wt. % to 35 wt. %, from 20 wt. % to 30 wt. %, from 25 wt. % to 40 wt. %, from 25 wt. % to 35 wt. %, or from 25 wt. % to 30 wt. % tackifier based on the total weight of the composition.

As previously discussed, the compositions disclosed herein may also include an oil. In some embodiments, the oil may include greater than 95 mole % aliphatic carbon compounds. In some embodiments, the oil may exhibit a glass transition temperature for the amorphous portion of the oil that is less than −70° C. In some embodiments, the oil can be a mineral oil. Examples of suitable oils may include, but are not limited to, mineral oil sold under the tradenames HYDROBRITE 550 (Sonneborn), PARALUX 6001 (Chevron), KAYDOL (Sonneborn), BRITOL 50T (Sonneborn), CLARION 200 (Citgo), CLARION 500 (Citgo), or combinations thereof. In some embodiments, the oil may comprise a combination or two or more oils described herein. The compositions disclosed herein may include from greater than 0 wt. % to 8 wt. % oil. For example, in some embodiments, the compositions may include from greater than 0 wt. % to 7 wt. %, from 3 wt. % to 8 wt. %, from 3 wt. % to 7 wt. %, from 5 wt. % to 8 wt. %, or from 5 wt. % to 7 wt. % oil based on the total weight of the composition.

The present compositions may optionally include one or more additives. Examples of suitable additives may include, but are not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof. In an embodiment, the compositions further comprise one or more additional polymers. Additional polymers include, but are not limited to, ethylene-based polymers and propylene-based polymers.

In some embodiments, the compositions disclosed herein may include from 30 wt. % to 65 wt. % ethylene/α-olefin random copolymer, from 10 wt. % to 35 wt. % styrenic block copolymer, from 20 wt. % to 40 wt. % tackifier, and from greater than 0 wt. % to 8 wt. % oil. In other embodiments, the compositions may include from 33 wt. % to 55 wt. % ethylene/α-olefin random copolymer, from 10 wt. % to 30 wt. % styrenic block copolymer, from 25 wt. % to 30 wt. % tackifier, and from 5 wt. % to 7 wt. % oil.

In some embodiments, the compositions may have an overall density of less than or equal to 0.930 g/cm$^3$, or less than or equal to 0.920 g/cm$^3$. In some embodiments, the compositions may have an overall density of from 0.880 g/cm$^3$ to 0.930 g/cm$^3$, from 0.880 g/cm$^3$ to 0.920 g/cm$^3$, from 0.890 g/cm$^3$ to 0.930 g/cm$^3$, or from 0.89 g/cm$^3$ to 0.92 g/cm$^3$.

In some embodiments, the compositions may exhibit an overall melt index ($I_2$) of from 2 grams per 10 minutes (g/10 min) to 15 g/10 min. For example, in some embodiments, the compositions may exhibit an overall melt index ($I_2$) of from 2 g/10 min to 14 g/10 min, from 2 g/10 min to 12 g/10 min, from 2 g/10 min to 10 g/10 min, from 3 g/10 min to 15 g/10 min, from 3 g/10 min to 14 g/10 min, from 3 g/10 min to 12 g/10 min, from 3 g/10 min to 10 g/10 min, from 5 g/10 min to 15 g/10 min, from 5 g/10 min to 14 g/10 min, from 5 g/10 min to 12 g/10 min, from 5 g/10 min to 10 g/10 min, from 7 g/10 min to 15 g/10 min, from 7 g/10 min to 14 g/10 min, from 7 g/10 min to 12 g/10 min, or from 7 g/10 min to 10 g/10 min. The overall melt index ($I_2$) is determined according to ASTM D1238 at 190° C. and 2.16 kg load.

The dynamic melt viscosity may be determined using Dynamic Mechanical Spectroscopy (DMS) at a various testing temperatures and testing frequency. The compositions may exhibit a dynamic melt viscosity of from 1,000 Pa-s to 1,400 Pa-s measured using DMS at a temperature of 190° C. and a frequency of 1 Hz. The compositions may exhibit a dynamic melt viscosity of from 3,200 Pa-s to 4,000 Pa-s measured using DMS at a temperature of 150° C. and a frequency of 1 Hz. The compositions may exhibit a dynamic melt viscosity of from 7,400 Pa-s to 7,800 Pa-s measured using DMS at a temperature of 130° C. and a frequency of 1 Hz. The compositions may exhibit a dynamic melt viscosity of from 12,400 Pa-s to 17,200 Pa-s measured using DMS at a temperature of 110° C. and a frequency of 1 Hz.

In some embodiments, the compositions disclosed herein may exhibit a melt temperature of less than or equal to 100° C., less than or equal to 90° C., or even less than or equal to 80° C. In some embodiments, the compositions may exhibit a melt temperature of from 60° C. to 100° C., from 60° C. to 90° C., from 60° C. to 80° C., from 70° C. to 100° C., or from 70° C. to 90° C. In some embodiments, the compositions may exhibit no melting peaks above 100° C.

The compositions may exhibit an initial internal cohesion force of less than or equal to 40 newtons/inch (N/in), less than or equal to 37 N/in, less than 35 N/in, or even less than 30 N/in after being heat sealed at a heat sealing temperature of 150° C. The initial internal cohesion force of the compositions may be determined according to the test method for peel strength described herein. In some embodiments, the compositions may exhibit an initial internal cohesion force of from 25 N/in to 40 N/in, from 25 N/in to 37 N/in, from 25 N/in to 35 N/in, from 27 N/in to 40 N/in, from 27 N/in to 37 N/in, from 27 N/in to 35 N/in, from 30 N/in to 40 N/in, from 30 N/in to 37 N/in, or from 30 N/in to 35 N/in after being heat sealed at a heat sealing temperature of 130° C.

In some embodiments, the compositions may exhibit a reclose peel adhesion force of greater than or equal to 1.0 N/in after being heat sealed at a heat seal temperature of 150° C., initially opened, and after experiencing at least 4 reclose-reopen cycles. In some embodiments, the compositions may exhibit a reclose peel adhesion force of greater than or equal to 1.5 N/in, greater than or equal to 2.0 N/in, or even greater than 2.5 N/in after being heat sealed at a heat seal temperature of 150° C., initially opened, and after experiencing at least 4 reclose-reopen cycles. In some embodiments, the compositions may exhibit a reclose peel adhesion force of from 2.0 N/in to 10.0 N/in, from 2.0 N/in to 7.0 N/in, from 2.0 N/in to 5.0 N/in, from 2.5 N/in to 10.0 N/in, from 2.5 N/in to 7.0 N/in, or from 2.5 N/in to 5.0 N/in after being heat sealed at a heat seal temperature of 150° C., initially opened, and after experiencing at least 4 reclose-reopen cycles.

The compositions disclosed herein may be compounded using a single stage twin-screw extrusion process or any other conventional blending or compounding process.

The compositions disclosed herein may be incorporated into a multilayer film, which may provide reclose functionality to packaging made from the multilayer film. The multilayer film may include at least three layers: a sealing layer forming a facial surface of the multilayer film, a reclose layer in adhering contact with the sealing layer, and at least one supplemental layer in adhering contact with the reclose layer. The sealing layer may seal the multilayer film to a substrate, such as a surface of a container, another flexible film, or to itself, for example. The reclose layer, once activated by exerting an initial opening force on the multilayer film, may provide reclose/reopen functionality to the multilayer film. At least one supplemental layer may provide structural support to the multilayer film or may provide an additional sealing layer.

Referring to FIG. 1, the multilayer film 100 is illustrated that includes at least three layers: Layer A, Layer B, and Layer C. The multilayer film 100 will be described relative to an embodiment having three layers; however, the multilayer film may have more than three layers, such as 4, 5, 6, 7, 8, or more than 8 layers. For example, referring to FIG. 2, the multilayer film may have 4 layers: Layer A, Layer B, Layer C, and Layer D. Multilayer films with more than 4 layers are also contemplated.

Referring again to FIG. 1, the multilayer film 100 may have a film top facial surface 102 and a film bottom facial surface 104. Similarly, each of the layers A, B, and C may have opposing facial surfaces, such as a top facial surface and a bottom facial surface. As used in this disclosure, the term "top" refers to the facial surface of the multilayer oriented toward the Layer A side of the multilayer film 100, and the term "bottom" refers to the opposite side of the multilayer film 100 oriented away from the Layer A side of the multilayer film 100.

Layer A may have a top facial surface 112 and a bottom facial surface 114. The top facial surface 112 of Layer A may be the film top facial surface 102 of the multilayer film 100. The bottom facial surface 114 of Layer A may be in adhering contact with the top facial surface 122 of Layer B.

Layer A is a sealing layer that includes a sealing composition capable of sealing the film top facial surface 102 of the multilayer film 100 to a surface of a substrate or to itself. For example, in some embodiments, the sealing composition may be a heat sealing composition. In some embodiments, the sealing composition may be capable of hermetically sealing the film top facial surface 102 of the multilayer film 100 to a surface of a substrate or to itself. In some embodiments, the sealing composition may include a polyolefin. For example, in some embodiments, the sealing composition of Layer A may include at least one of low density polyethylene (LDPE), linear low density polyethylene (LLDPE), ultra-low density polyethylene (ULDPE), ethylene vinyl acetate (EVA), ionomers, other sealing composition, or combinations of these. Examples of sealing compositions may include, but are not limited to, AFFINITY™ polyolefin elastomer supplied by The Dow Chemical Company, Midland, Mich. In some embodiments, Layer A does not include the composition previously described in this disclosure. The sealing composition of Layer A has an internal cohesive strength greater than the internal cohesive strength of the composition of Layer B.

The sealing composition of Layer A may have an internal cohesion strength that is greater than the internal cohesion strength of the composition of Layer B. During initial opening of the multilayer film 100, such as when opening a resealable package made with the multilayer film 100, the initial opening force causes the sealing composition of Layer A to fail in a direction generally perpendicular to the multilayer film 100. Failure of the sealing composition of Layer A may enable the composition of Layer B to cohesively fail in a direction generally parallel to the multilayer film 100 to activate the reclose functionality. Therefore, the internal cohesion strength of Layer A may be low enough so that the magnitude of the opening force needed to initially open the multilayer film 100 and activate the reclose/reopen functionality is not excessive.

Referring to FIG. 1, Layer B includes the top facial surface 122 and a bottom facial surface 124. The top facial surface 122 of Layer B may be in adhering contact with the bottom facial surface 114 of Layer A. Additionally, the bottom facial surface 124 of Layer B may be in adhering contact with a top facial surface 132 of Layer C. Thus, Layer B is positioned adjacent to Layer A and in adhering contact with Layer B, and Layer B is disposed between Layer A and Layer C. Layer B comprises the compositions previously described in this disclosure that include the ethylene/α-olefin random copolymer, styrenic block copolymer, tackifier, and oil.

Layer C includes the top facial surface 132 and a bottom facial surface 134. As previously discussed, the top facial surface 132 of Layer C may be in adhering contact with the bottom facial surface 124 of Layer B. In some embodiments, the bottom facial surface 134 of Layer C may comprise the film bottom facial surface 104 of the multilayer film 100, such as when the multilayer film 100 includes three layers. Alternatively, in other embodiments, the bottom facial surface 134 of Layer C may be in adhering contact with a top facial surface of a subsequent layer. For example, referring to FIG. 2, the bottom facial surface 134 of Layer C may be in adhering contact with a top facial surface 142 of Layer D.

In some embodiments, Layer C may be a structural layer that may provide strength and stiffness to the multilayer film 100. In some embodiments, Layer C may include a polymer or copolymer comprising at least an ethylene monomer, such as, but not limited to high density polyethylene (HDPE), medium density polyethylene (MDPE), low density polyethylene (LDPE), linear low density polyethylene (LLDPE), very low density polyethylene (VLDPE), or combinations of these. For example, in some embodiments, Layer C may include LLDPE. In other embodiments, Layer C may include other polymer film materials, such as nylon, polypropylene, polyesters such as polyethylene terephthalate (PET) for example, polyvinyl chloride, other thermoplastic polymers, or combinations of these. In some embodiments, Layer C may include additional structural materials, such as nylon for example. In other embodiments, Layer C may be a sealant layer that includes any of the sealant compositions previously discussed in relation to Layer A.

In some embodiments, the multilayer film 100 may be a flexible film, which may enable the multilayer film 100 to conform its shape to seal to various substrates and substrate surfaces.

Additional supplemental layers may be added to the bottom facial surface 134 of Layer C to impart any of a number of properties to the multilayer film. For Example, referring to FIG. 2, a multilayer film 200 that includes four layers is schematically depicted. As shown, multilayer film 200 may include Layer A, Layer B, Layer C, and Layer D. Layer A may again be the sealing layer, and Layer B may be the reclose layer in adhering contact with the sealing layer (Layer A). The multilayer film 200 depicted in FIG. 2 includes at least two supplemental layers; Layer C and Layer D. Layer C may have the top facial surface 132 in adhering contact with the bottom facial surface 124 of Layer B. The bottom facial surface 134 of Layer C may be in adhering contact with the top facial surface 142 of Layer D. In some embodiments, the bottom facial surface 144 of Layer D may be the film bottom facial surface 104 of the multilayer film 200. Alternatively, in other embodiments, the bottom facial surface 144 of Layer D may be in adhering contact with the top facial surface of another supplemental layer.

Each of the supplemental layers, such as Layers C and D and other supplemental layers, may include different materials or combinations of materials that provide different properties to the multilayer film 200, such as structural support, insulating properties, moisture resistance, chemical resistance, tear or puncture resistance, optical properties, sealing capability, gas permeability or impermeability properties, friction resistance, other properties, or combinations of these. For example, in some embodiments, Layer C may include materials that provide structural support to the multilayer film, and Layer D may include a sealing composition, such as the sealing compositions previously described for Layer A, to enable sealing of the film bottom facial surface 104 of the multilayer film 200 to a second substrate. Layers C and D, as well as other supplemental layers included to the bottom portion of the multilayer film 200 may provide a plurality of other functionalities to the multilayer film 200.

Figure 2:
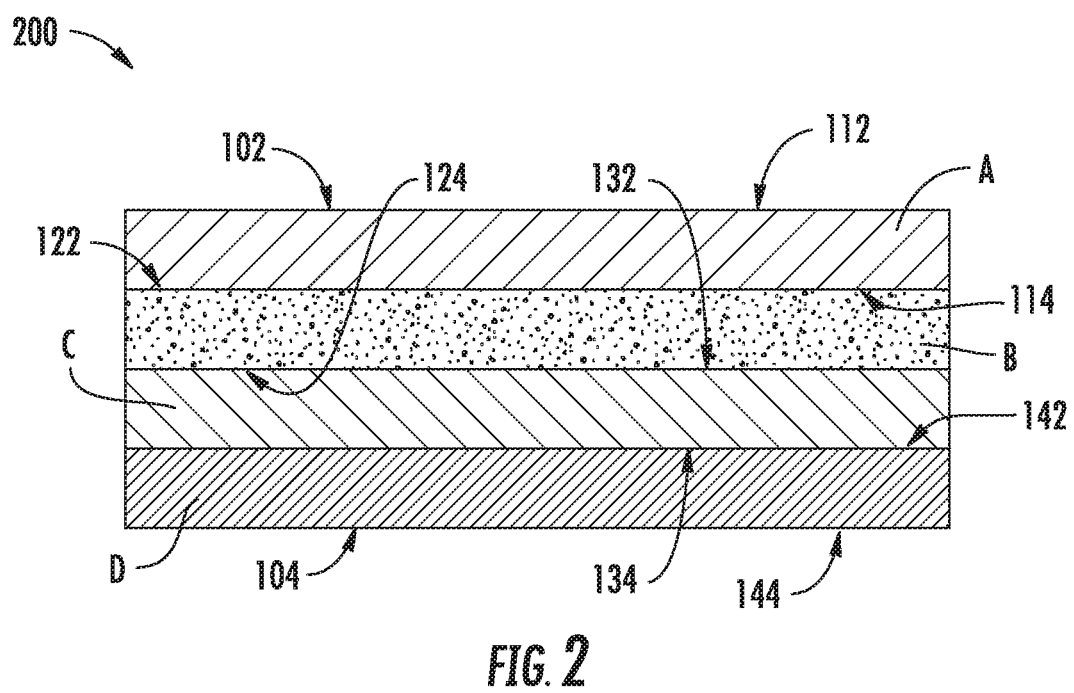
FIG. 2 schematically depicts a cross-sectional view of another multilayer film that includes 4 layers, in accordance with one or more embodiments of the present disclosure.

Referring to FIGS. 1 and 2, each of the plurality of layers, such as Layer A, Layer B, Layer C, and any additional supplemental layers, may be coextruded to form the multilayer films 100, 200. For example, in some embodiments, the multilayer films 100, 200 may be produced using a blown film process. Alternatively, in other embodiments, the multilayer films 100, 200 may be produced using cast film processes. Other conventional processes for producing multilayer films may also be employed to produce the multilayer films 100, 200.

Referring to FIGS. 3A-3C, operation of the multilayer film 100 will be described. The multilayer film 100 may be initially sealed to a surface 152 of a substrate 150. The substrate 150 may be a rigid substrate, such as a rigid container made from plastic, metal, glass, ceramic, coated or uncoated cardboard (e.g., fiberboard, paperboard or other rigid structure made from wood pulp), other rigid material, or combinations of these. Alternatively, the substrate 150 may be a non-rigid or flexible substrate, such as a polymer film, metal foil, paper, natural or synthetic fabric, other flexible substrate, or combinations of these. For example, in some embodiments, the substrate 150 may include another multilayer polymer film. Is some embodiments, the substrate 150 may be the multilayer film 100 itself, such as by folding the multilayer film 100 and sealing the multilayer film 100 to itself or by providing two separate sheets or webs of the multilayer film 100. In some embodiments, the film top facial surface 102 in one region of the multilayer film 100 may be in adhering contact with the film top facial surface 102 in another region of the multilayer film 100 or with the film top facial surface 102 of another sheet of the multilayer film 102. Alternatively, the film top facial surface 102 in one region of the multilayer film 100 may be in adhering contact with the film bottom facial surface 104 in another region of the multilayer film 102.

Referring to FIG. 3A, the multilayer film 100 may be sealed to the surface 152 of the substrate 150 by contacting the top facial surface 112 of Layer A with a surface 152 of the substrate 150 and applying heat, pressure, or a combination of heat and pressure to the multilayer film 100 to seal the Layer A, which is the sealing layer of the multilayer film 100, to the surface 152 of the substrate 150. In some embodiments, Layer A of the multilayer film 100 may be heat sealed to the substrate 150. Heat sealing may be accomplished by conventional heat sealing processes which may be operated at heat sealing temperatures of greater than about 130° C. For example, in some embodiments, Layer A of the multilayer film 100 may be heat sealed to the surface 152 of the substrate 150 at a heat sealing temperature of from 100° C. to 180° C. In some embodiments, the heat sealing temperature may be from 100° C. to 160° C., from 100° C. to 150° C., from 120° C. to 180° C., from 120° C. to 160° C., from 120° C. to 150° C., from 130° C. to 180° C., from 130° C. to 160° C., or from 130° C. to 150° C.

In some embodiments, only a portion of Layer A of the multilayer film 100 is sealed to the surface 152 of the substrate 150 to form a sealed region 154. The portions of the multilayer film 100 in which Layer A is not sealed to the surface 152 of the substrate 150 may define an unsealed region 156 of the multilayer film 100. In the unsealed region 156, Layer A of the multilayer film 100 is not sealed to the surface 152 of the substrate 150 and may be free to move in a direction normal to the surface 152 of the substrate 150 so that Layer A of the multilayer film 100 is spaced apart from the substrate 150 in the unsealed region 156. For example, in some embodiments, in the unsealed region 156, the multilayer film 100 may be spaced apart from the substrate 150 to define a volume between the multilayer film 100 and the substrate 150. Alternatively or additionally, in some embodiments, the unsealed region 156 may provide a tab 158 that may enable a force to be exerted on the multilayer film 100 relative to the substrate 150.

In some embodiments, the sealed regions 154 may exhibit a seal integrity sufficient to prevent passage of particulates between the multilayer film 100 and the substrate 150 in the sealed region 154. In other embodiments, seal integrity of the sealed regions 154 may be sufficient to prevent passage of liquids between the multilayer film 100 and the substrate 150 in the sealed region 154. In still other embodiments, seal integrity of the sealed regions 154 may be sufficient to prevent passage of moisture between the multilayer film 100 and the substrate 150 in the sealed region 154. In still other embodiments, seal integrity of the sealed regions 154 may be sufficient to prevent passage of are between the multilayer film 100 and the substrate 150 in the sealed region 154.

Upon sealing the film top facial surface 102 of the multilayer film 100 to the surface 152 of the substrate 150 to form the sealed region 154, a bond strength between the bottom facial surface 114 of Layer A and the top facial surface 122 of Layer B may be greater than a cohesive strength of the composition of Layer B. Additionally, after sealing, a bond strength between the bottom facial surface 124 of Layer B and the top facial surface 132 of Layer C may be also be greater than an internal cohesion strength of the composition of Layer B. After sealing, the bond strength of the top facial surface 112 of Layer A to the surface 152 of the substrate 150 may be greater than an internal cohesion strength of the composition of Layer B. Therefore, the sealing composition of Layer A does not provide reclose functionality to the multilayer film 100. Once sealed to the substrate 150, the multilayer film 100 does not exhibit reclose functionality until after an initial opening force is applied to the multilayer film 100 to separate a portion of the multilayer film 100 from the substrate 150.

Referring to FIG. 3B, the reclose functionality of the multilayer film 100 may be activated by applying an initial opening force F1 on the multilayer film 100. The initial opening force F1 may be applied in a direction generally perpendicular to the film top facial surface 102 of the multilayer film 100. The initial opening force F1 may be greater than a threshold force, at which separation of the multilayer film 100 occurs to activate the reclose functionality. The initial opening force F1 may be sufficient to cause Layer A to fail at an interface 160 between the sealed region 154 and the unsealed region 156 of the multilayer film 100. In some embodiments, the initial opening force F1 for the multilayer film 100 may be less than or equal to about 40 newtons/inch (N/in), less than less than or equal to 37 N/in, less than or equal to 35 N/in, or even less than or equal to 30 N/in after being heat sealed at a heat sealing temperature of 150° C. The initial opening force F1 may be determined according to the Peel Adhesion Test described herein. The initial opening force F1 of the multilayer film may be determined according to the test method for peel strength described herein at the heat sealing temperature of 130° C. In some embodiments, the initial opening force F1 for the multilayer film 100 may be from 25 N/in to 40 N/in, from 25 N/in to 37 N/in, from 25 N/in to 35 N/in, from 27 N/in to 40 N/in, from 27 N/in to 37 N/in, from 27 N/in to 35 N/in, from 30 N/in to 40 N/in, from 30 N/in to 37 N/in, or from 30 N/in to 35 N/in after the multilayer film is heat sealed at a heat sealing temperature of 130° C.

At an initial opening force F1 greater than the threshold force, Layer A ruptures at an interface 160 of the sealed region 154 and the unsealed region 156. Layer A may rupture in a direction from the bottom facial surface 114 to the top facial surface 112 of Layer A (e.g., generally perpendicular to the film top facial surface 102 or in the +/−Z direction of the coordinate axis of FIG. 3B). The internal cohesion strength of the composition of Layer B is less than the initial opening force and less than the bond strengths between the top facial surface 122 of Layer B and the bottom facial surface 114 of Layer A, and between the bottom facial surface 124 of Layer B and the top facial surface 132 of Layer C. Thus, once Layer A ruptures at the interface 160 of the sealed region 154 and the unsealed region 156, Layer B in the sealed region 154 cohesively fails in a direction generally parallel to the film top facial surface 102. Cohesive failure of Layer A results in a first portion 162 of the composition of Layer B coupled to the bottom facial surface 114 of Layer A and a second portion 164 of the composition of Layer B coupled to the top facial surface 132 of Layer C. Thus, in the opened portion of the sealed region 154, the composition of Layer B covers both the top facial surface 132 of Layer C and the bottom facial surface 114 of Layer A. The portion of Layer A in the sealed region 154, including the opened portion of the sealed region 154, remains sealed to the substrate 150 (i.e., the top facial surface 112 of Layer A remains sealed to the surface 152 of the substrate 150 in the sealed region 154, including the opened portion).

Figure 4A:
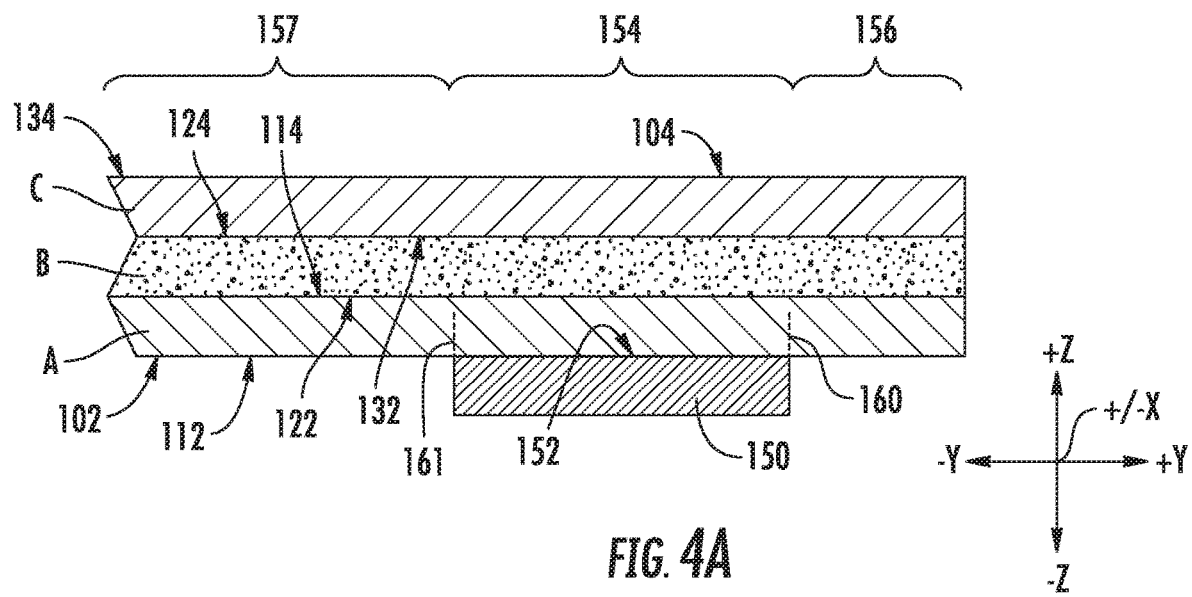
FIG. 4A schematically depicts a cross-sectional view of the multilayer film of FIG. 3A taken along reference line 4A-4A in FIG. 3A, in accordance with one or more embodiments of the present disclosure.
Figure 4B:
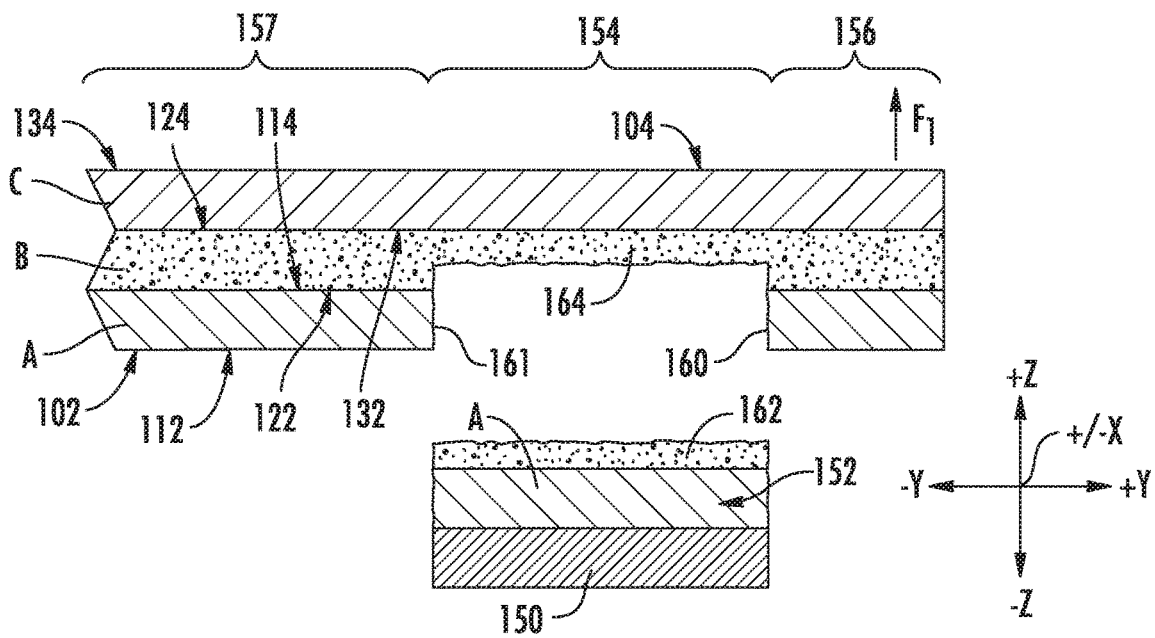
FIG. 4B schematically depicts a cross-sectional view of the multilayer film of FIG. 4A in which the multilayer film has been initially opened to activate the reclose functionality of the multilayer film, in accordance with one or more embodiments of the present disclosure.

Referring to FIG. 4A, a cross-section of the multilayer film 100 and substrate 150 of FIG. 3A is taken along reference line 4A-4A. In the embodiments schematically represented in FIG. 4A, the sealed region 154 may bounded by the unsealed region 156 on one side of the sealed region 154 and a second unsealed region 157 on the other side of the sealed region. During initial opening, the initial opening force F1 may cause Layer A to rupture at the interface 160 of the sealed region 154 and the unsealed region 156 in a direction generally perpendicular to the film top facial surface 102, as previously described in relation to FIG. 3B. As shown in FIG. 4B, the opening force F1 may cause Layer B to cohesively fail in a direction generally parallel to the film top facial surface 102, as previously described. When cohesive failure of Layer B reaches a second interface 161 between the sealed region 154 and the second unsealed region 157, the initial opening force F1 may cause Layer A to rupture again at the second interface 161 between the sealed region 154 and the second unsealed region 157. At the second interface 161, Layer A may rupture in a direction generally perpendicular to the film top facial surface 102. After initial opening of the multilayer film 100, a portion of Layer A corresponding to the sealed region 154 is separated from the multilayer film 100 and remains coupled to the substrate 150.

Initial opening of the multilayer film 100 activates the reclose functionality of the multilayer film resulting in the first portion 162 of the composition of Layer B on the bottom facial surface 114 of Layer A and the second portion 164 of the composition of Layer B on the top facial surface 132 of Layer C. Referring to FIG. 3C, to reclose the sealed region 154 of the multilayer film 100, the first portion 162 of the composition of Layer B may be returned into contact with the second portion 164 of the composition of Layer B and a reclose pressure F2 may be applied to the multilayer film 100 in the sealed region 154. The reclose pressure F2 may be applied to the multilayer film 100 in a direction generally perpendicular to the film bottom facial surface 104. The reclose pressure F2 may be sufficient to cause the first portion 162 and the second portion 164 of the composition of Layer B to re-adhere to reform Layer B. In some embodiments, the reclose pressure F2 may be less than or equal to 40 N/inch, less than or equal to 30 N/inch, less than or equal to 20 N/inch, or even less than or equal to 10 N/inch.

Applying the reclose pressure F2 to the multilayer film causes the first portion 162 and the second portion 164 of the composition of Layer B to re-adhere. Re-adherence of the first portion 162 and the second portion 164 of the composition to form a contiguous Layer B, may reseal the sealed region 154 of the multilayer film.

Referring to FIG. 3D, after reclosing the multilayer film 100, the multilayer film 100 may be reopened by applying a reopen force F3 to the multilayer film 100. Reopen force F3 may be applied to the multilayer film in a direction generally perpendicular to the film top facial surface 102. The reopen force F3 may be applied by gripping the multilayer film 100 in the unsealed region 156 and pulling the multilayer film 100 away from the substrate 150. Application of the reopen force F3 may cause the composition of Layer B to cohesively fail in a direction parallel to the film top facial surface 102. Again, cohesive failure of the composition of Layer B results in a first portion of the composition coupled to the bottom facial surface 114 of Layer A and a second portion of the composition coupled to the top facial surface 132 of Layer C.

The reopen force F3 may be sufficient to cause the composition of Layer B to cohesively fail. In some embodiments reopen force F3 may be greater than or equal to 1 N/inch, greater than or equal to 1.5 N/in, greater than or equal to 2.0 N/in, greater than or equal to 2.5 N/in, or even greater than or equal to 3 N/in for the multilayer film 100 heat sealed to the substrate 150 at a heat seal temperature of 130° C. The reopen force F3 may be determined according to the Peel Adhesion Test described herein. The multilayer film 100 may be subjected to multiple cycles of reopening and reclosing. After multiple reopen/reclose cycles, the multilayer film 100 may exhibit a reopen force F3 of greater than or equal to 1.5 N/in, greater than or equal to 2.0 N/in, greater than or equal to 2.5 N/in, or even greater than 3.0 N/in. For example, in some embodiments, the multilayer film 100, which is initially heat sealed to the substrate 150 at a heat seal temperature of 130° C., may exhibit a reopen force F3 after at least four reopen/reclose cycles of greater than 2.0 N/in. In some embodiments, the multilayer film 100 may exhibit a reopen force of from 2.0 N/in to 10.0 N/in, from 2.0 N/in to 7.0 N/in, from 2.0 N/in to 5.0 N/in, from 2.5 N/in to 10.0 N/in, from 2.5 N/in to 7.0 N/in, or from 2.5 N/in to 5.0 N/in after being heat sealed at a heat seal temperature of 130° C., initially opened, and after experiencing at least 4 reclose-reopen cycles.

Figure 5A:
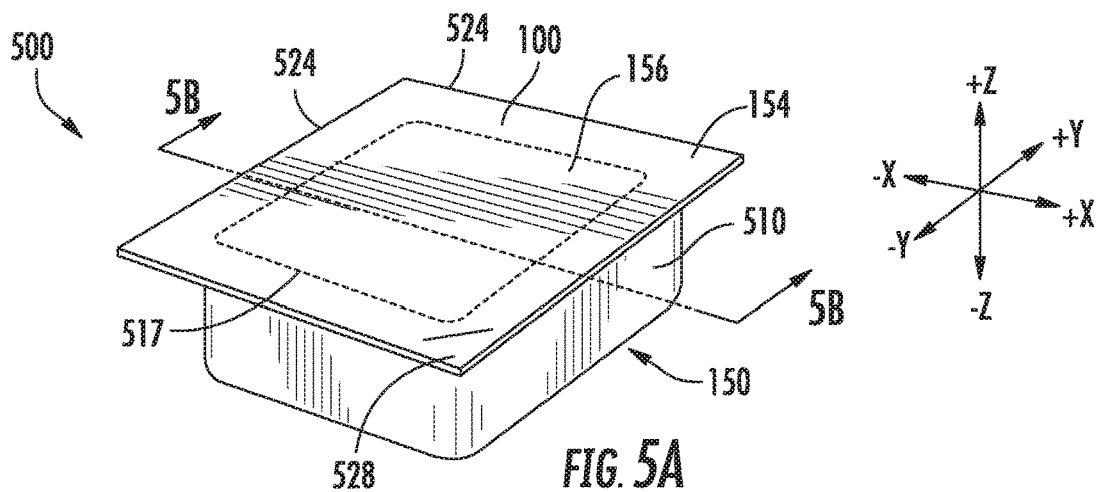
FIG. 5A schematically depicts a perspective view of an embodiment of a package that includes a tray and the multilayer film of FIG. 1 sealed to the tray, in accordance with one or more embodiments of the present disclosure.
Figure 5B:
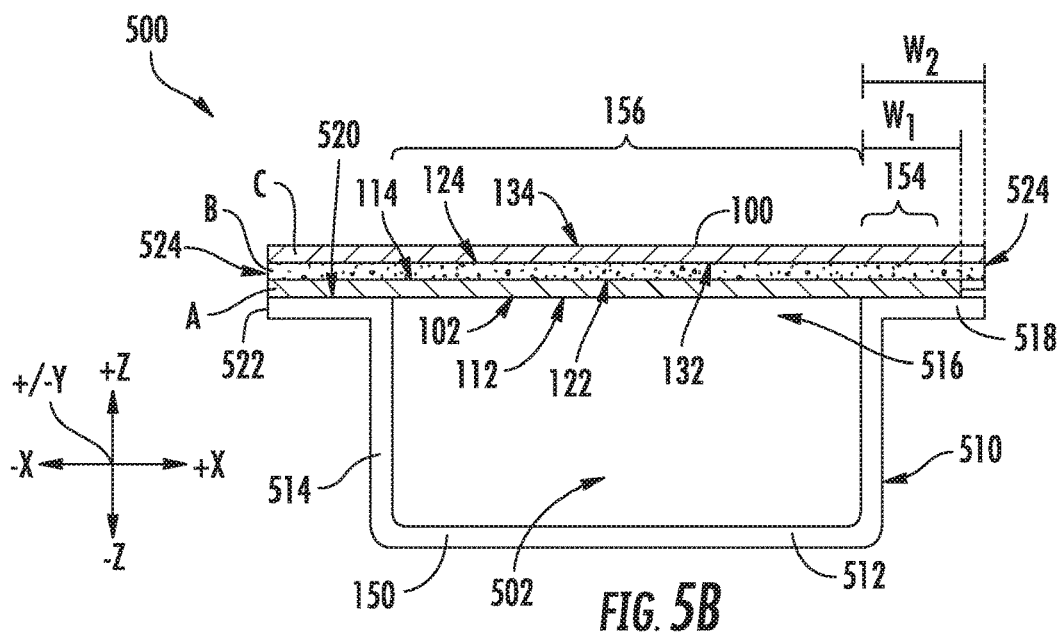
FIG. 5B schematically depicts a cross-sectional view of the package of FIG. 5A taken along reference line 5B-5B in FIG. 5A, in accordance with one or more embodiments of the present disclosure.
Figure 5C:
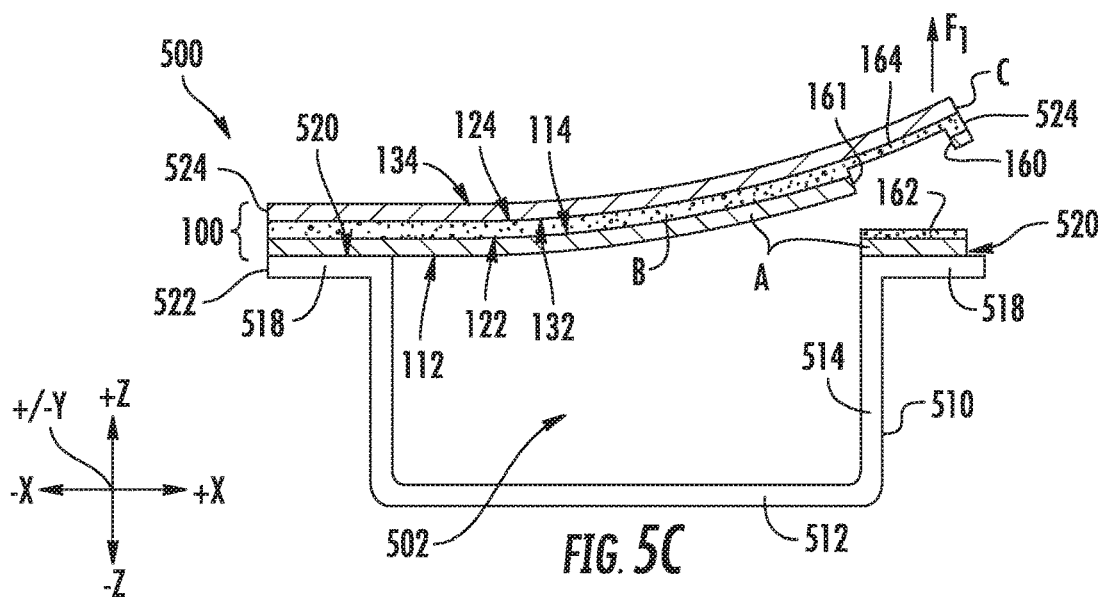
FIG. 5C schematically depicts a cross-sectional view of the package of FIG. 5B in which a portion of the multilayer film has been initially opened to activate the reclose/reopen functionality, in accordance with one or more embodiments of the present disclosure.

The multilayer film 100 previously described herein may be used to provide reclose functionality to packaging, such as packaging for consumer goods, food products, or other articles. For example, referring to FIGS. 5A-5C, a package 500 may include the substrate 150 and the multilayer film 100 sealed to at least one of the surfaces 152 of the substrate 150. The multilayer film 100 may be oriented so that Layer A of the multilayer film 100 face towards the surface 152 of the substrate 150 and the film top facial surface 102 may contact the surface 152 of the substrate 150. In FIGS. 5A-5C, the multilayer film 100 is oriented so that the film top facial surface 102 is facing downward in the −Z direction of the coordinate axis of FIGS. 5A-5C. The package 500 may include the sealed region 154 in which at least a portion of the top facial surface 112 of Layer A of the multilayer film 100 is sealed to at least one of the surfaces 152 of the substrate 150 to form a seal between the multilayer film 100 and the substrate 150. In the unsealed region 156, the multilayer film 100 and the substrate 150 define a volume 502 therebetween for containing a composition or article. The substrate 150 may be a rigid substrate or a flexible substrate. In some embodiments, the substrate 150 may be another portion of the multilayer film 100, such as a separate sheet of the multilayer film 100 or another part of the same sheet of the multilayer film 100.

Referring to FIGS. 5A and 5B, the substrate 150 of package 500 may include a rigid substrate. For example, in some embodiments, the substrate 150 may be a rigid tray 510 that includes a bottom wall 512 and four side walls 514 extending from the bottom wall 512 to define an open-sided container having one open side 516. The tray 510 may include a flange 518 coupled to the four side walls 514 and surrounding the open side 516 of the tray 510. The flange 518 may include a facial surface 520. In some embodiments, the facial surface 520 may be oriented in a direction perpendicular to the bottom 512 of the tray 510. In FIGS. 5A-5C, the facial surface 520 faces upward in the +Z direction of the coordinate axis of FIGS. 5A-5C. The proportions in FIGS. 5A-5C are exaggerated for purposes of illustration. The multilayer film 100 may be any of the multilayer films previously described in this disclosure. The multilayer film 100 may be oriented so that the film top facial surface 102 faces and contacts the facial surface 520 of the tray 510 (i.e., in the −Z direction of the coordinate axis of FIG. 5B). The multilayer film 100 may have a shape that conforms to an outer shape of the flange 518 of the tray 510 such that a plurality of edges 524 of the multilayer film 100 are positioned proximal to the outer edges 522 of the flange 518 of the tray 510. Although package 500 is described in the context of using multilayer film 100 with three layers, it is understood that multilayer films incorporating the composition disclosed herein and having more than three layers, such as multilayer film 200 for example, may also be used to make the package 500.

In some embodiments, the multilayer film 100 may be sealed to the facial surface 520 of the flange 518 of the tray 510 to form the sealed region 154 that extends along the flange 518. The multilayer film 100 may be sealed to the facial surface 520 of the flange 518 by heat sealing, applying an adhesive, or other conventional sealing process. The sealed region 154 may extend around the entire perimeter of the open side 516 of the tray 510 so that the volume 502 of the tray 510 is completely enclosed and isolated from the ambient atmosphere. In some embodiments, the sealed region 154 may extend to the edges 524 of the multilayer film 100. In some embodiments, the sealed region 154 may extend to the outer edges 522 of the flange 518. In some embodiments, the sealed region 154 may be spaced apart from the edges 524 of the multilayer film 100, the outer edges 522 of the flange 518, or both.

The sealed region 154 may have a width W1, and the flange 518 may have a width W2. The width W1 of the sealed region 154 may be less than or equal to the width W2 of the flange 518. In other embodiments, the multilayer film 100 may be sealed to other surfaces of the tray 510, such as the surfaces of the side walls 514 of the tray 510. The width W1 of the sealed region 154 may be adjusted to change the initial opening force or reopen force needed to initially open or reopen the package 500.

Referring to FIG. 5A, in some embodiments, the multilayer film 100 of the package 500 may include a tab 528 proximal to an edge 524 of the multilayer film 100. At the tab 528, the multilayer film 100 may not be sealed to the flange 518 of the tray 510. Thus, the tab 528 may include an unsealed region of the multilayer film 100 extending outward from the sealed region 154. The tab 528 may provide a location from which to apply an initial opening force, a reopen force, or both to the multilayer film 100 to enable opening or reopening of the package 500.

Referring to FIG. 5B, the unsealed region 156 of the multilayer film 100 that is disposed inward from the sealed region 154 may extend over the open side 516 of the tray 510 to cover the open side 516 of the tray 510. The bottom wall 512 and side walls 514 of the tray 510 and the unsealed region 156 of the multilayer film 100 may define the volume 502 of the package 500.

Referring to FIG. 5C, the package 500 may be initially opened to activate a reclose functionality of the multilayer film 100. During initial opening of the package 500, an initial opening force F1 may be applied to the multilayer film 100 to pull the multilayer film 100 away from the tray 510 to thereby open the package 500. As previously described, upon applying the initial opening force F1 to the multilayer film 100, Layer A of the multilayer film 100 may fail in a direction generally perpendicular to the facial surface 520 of the flange 518 at the interface 160, the second interface 161, or both, and Layer B may cohesively fail in a direction generally parallel to the facial surface 520 of the flange 518. Cohesive failure of Layer B of the multilayer film 100 may result in the first portion 162 of the composition of Layer B coupled to the bottom facial surface 114 of Layer A and the second portion 164 of the composition of Layer B coupled to the top facial surface 132 of Layer C. As previously discussed, the package 500 may be reclosed by returning the multilayer film 100 into contact with the tray 510 so that the first portion 162 and the second portion 164 of the composition of Layer B in the sealed region 154 come into contact. A reclose pressure may be applied to the multilayer film 100 in a direction towards the flange 518 of the tray 510 to adhere the first portion 162 and the second portion 164 of the composition of Layer B together to reclose and reseal the package 500. The package 500 may be reopened by again applying a force to pull the multilayer film 100 away from the tray 510. The package 500 may be reclosed and reopened one or a plurality of times.

After sealing the multilayer film 100 to the tray 510 at a sealing temperature of equal to or greater than 130° C., the multilayer film 100 may exhibit an initial opening force F1 of less than 40 N/inch, less than 37 N/inch, less than 35 N/inch, or less than 30 N/inch and a reopen force of greater than or equal to 2.0 N/inch, greater than 2.5 N/inch, or even greater than 3.0 N/inch after at least 4 reclose/reopen cycles.

Figure 6A:
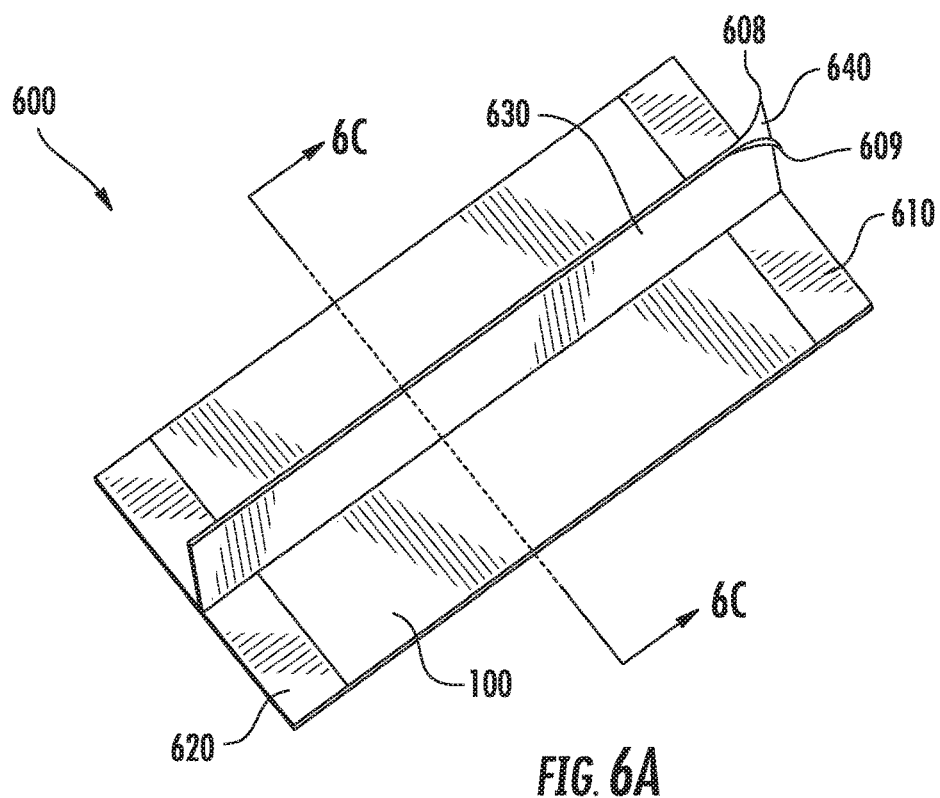
FIG. 6A schematically depicts a top perspective view of a pouch package that includes the multilayer film of FIG. 1, in accordance with one or more embodiments of the present disclosure.
Figure 6B:
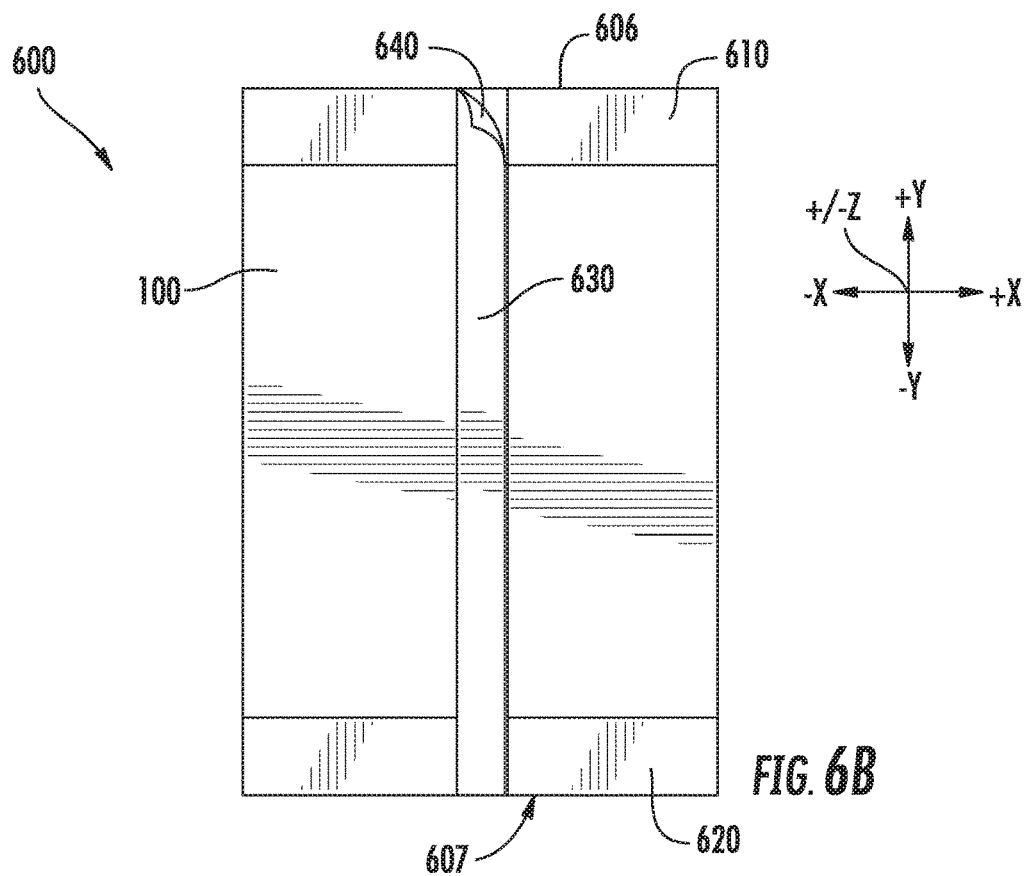
FIG. 6B schematically depicts a top plan view of the pouch package of FIG. 6A, in accordance with one or more embodiments of the present disclosure.

Referring now to FIGS. 6A-6C, the multilayer film 100 may be used in making pouch packages, which are identified herein by reference number 600. In one or more embodiments, the pouch package 600 may be a vertical form fill seal (VFFS) pouch package. The pouch package 600 may generally include a single sheet 601 of a flexible film, such as the multilayer film 100, the sheet 601 having a first end 606 and a second end 607 oriented in the transverse direction (i.e., extending in the +/−X direction of the coordinate axis in FIG. 6B). The sheet 601 may also include a first longitudinal edge 608 and a second longitudinal edge 609, which both extend in the longitudinal direction (i.e., in the +/−Y direction of the coordinate axis of FIG. 6B) from the first end 606 to the second end 607.

Referring to FIG. 6C, to form the pouch package 600, the first longitudinal edge 608 and the second longitudinal edge 609 are brought into contact with each other and sealed together to form a sleeve 602 that defines an internal volume 604 of the pouch package 600. The first longitudinal edge 608 may be sealed to the second longitudinal edge 609 so that the same side of the film is in adhering contact with itself. Referring to FIG. 6B, sealing the first longitudinal edge 608 to the second longitudinal edge 609 forms a fin seal 630 that extends longitudinally (i.e., in the +/−Y direction of the coordinate axis in FIGS. 6A-6C) along one side of the pouch package 600 from the first end 606 to the second end 607. The first end 606 may be sealed together to form a first end seal 610. The contents of the pouch package 600 may be filled into the internal volume 604 of the pouch package 600 and the second end 607 may be sealed to form a second end seal. Portions of the fin seal 630 may overlap with the first end seal 610 and the second end seal 620 at the first and second ends 606, 607 of the pouch package 600, respectively. The pouch package 600 may be formed filled and sealed using any conventional pouch packaging systems.

Conventional pouch packages can be opened by grasping the fin seal and the opposite face of the package and pulling apart one of the end seals. The amount of force needed to open the package depends on the amount of sealing material in the end seal. The end seal of a conventional pouch package may be at least 3 cm long and at least a 1.5 cm wide. The size of the end seal may require additional force to open the package. Additionally, extra unsealed film material may be needed to provide a place to grasp the opposite face. Therefore, the internal volume 604 of the conventional package may need to be larger than the volume of the contents contained therein to allow for opening of the package. Many conventional pouch packages are sealed at the end seals and fin seal using an acrylic or water-based cold set adhesive. These acrylic or water-based adhesives do not provide reclose and reopen functionality to the conventional pouch package. Additionally, the application of acrylic or water-based adhesives may require additional processing steps to make and seal the conventional pouch package.

The pouch package 600 of the present disclosure is made using the multilayer film 100 described herein, which may provide reopen/reclose functionality to the pouch package 600. Additionally, the pouch package 600 may be opened from the fin seal 630 of the pouch package 600, which may enable control of the initial opening force, reopen force, or both by changing the geometry of the fin seal 630.

Referring to FIG. 6B, in some embodiments, the single sheet 601 of flexible film may include the multilayer film 100 so that the pouch package 600 may be constructed entirely of the multilayer film 100. Referring to FIG. 6C, in making the pouch package 600, the longitudinal edges 608, 609 may be brought into contact with each other with the film top facial surface 102 of the multilayer film 100 at the first longitudinal edge 608 facing and contacting the film top facial surface 102 of the second longitudinal edge 609 along the fin seal 630. In this configuration, the sealing composition of Layer A at the first longitudinal edge 608 is in contact with the sealing composition of Layer A at the second longitudinal edge 609. The film top facial surface 102 of the multilayer film 100, therefore, forms the inner surface of the pouch package 600 that defines the internal volume 604 of the pouch package, as shown in FIG. 6C. Layer C and the film bottom facial surface 104 of the multilayer film 100, therefore, face outward from the internal volume 604 of the pouch package 600.

The first longitudinal edge 608 and the second longitudinal edge 609 may be sealed together, such as by heat sealing for example, along the fin seal 630 to form a fin 632. The fin 632 may include the fin seal 630 and a tab 640 positioned proximal to the first and second longitudinal edges 608, 609 of the multilayer film 100. The fin 632 may extend away from the internal volume 604 of the pouch package 600. The fin 632 is shown in FIG. 6C as extending vertically upward (i.e., +Z direction of the coordinate axis of FIG. 6C), however, the fin 632 may often fold down against the side of the pouch package 600 after filling and sealing. The tab 640 may be a portion of the fin 632 in which the multilayer film 100 is unsealed. The fin seal 630 may be disposed between the tab 640 and the sleeve 602 defining the internal volume 604 of the pouch package 600. The fin seal 630 may comprise the sealed region 154 of the multilayer film 100, and the sleeve 602 and the tab 640 may comprise the unsealed regions 156 of the multilayer film 100. The tab 640 may provide a region in which the first and second longitudinal edges 608, 609 of the multilayer film 100 may be grasped to facilitate initial opening and reopening of the pouch package 600. The tab 640 may extend the entire longitudinal dimension of the fin 632 or may extend over only a portion of the longitudinal dimension of the fin 632.

Referring to FIG. 6C, with the fin 632 extending vertically (i.e., +Z direction) from the sleeve 602, the fin 632 may have an overall height H measured from the sleeve 602 of the pouch package 600 to the first and second longitudinal edges 608, 609 of the multilayer film 100. The fin seal 630 may have a fin seal height $H_S$ measured from the sleeve 602 to the tab 640. The tab 640 may have a tab height $H_T$ measured from the fin seal 630 to the first and second longitudinal edges 608, 609 of the multilayer film 100.

Referring to FIG. 6B, the first end seal 610 and the second end seal 620 may also be sealed with the film top facial surfaces 102 facing each other so that Layer A of the multilayer film 100 is sealed to itself along the first end seal 610 and the second end seal 620. Thus, in some embodiments, the first end seal 610, the second end seal 620, or both may exhibit reopen/reclose functionality after initial opening of the pouch package 600.

In some alternative embodiments, the sheet 601 used to make the pouch package 600 may be constructed of a flexible film different from the multilayer film 100 disclosed herein, and the sheet 601 may include one or a plurality of strips of the multilayer film 100 coupled to the flexible film along the first longitudinal edge 608, the second longitudinal edge 609, or both of the sheet 601. A width of the strip of the multilayer film 100 may be greater than or equal to the height H of the fin 632 of the pouch package 600. The first and second longitudinal edges 608, 609 may be sealed along the strip of the multilayer film 100 to form the fin seal 630. The strips of the multilayer film 100 at the fin seal 630 may provide reopen/reclose functionality to the pouch package 600. In some embodiments, additional strips of the multilayer film 100 may be included along the first end 606, the second end 607, or both so that the first end seal 610, second end seal 620, or both may also exhibit reopen/reclose functionality.

Although the pouch package 600 is described herein in the context of the multilayer film 100 with three layers, it is understood that multilayer films incorporating the compositions disclosed herein and having more than three layers, such as multilayer film 200 for example, may also be used to make the pouch package 600.

Referring to FIGS. 7A-7C, the pouch package 600 may be initially opened at the fin seal 630 to activate the reclose/reopen functionality of the multilayer film 100 in the sealed region 154 corresponding to the fin seal 630. The reclose/reopen functionality of the multilayer film 100 is not activated until the pouch package 600 is initially opened. During initial opening of the pouch package 600, an initial opening force F1 may be applied to the multilayer film 100 at the first longitudinal edge 608 and the second longitudinal edge 609 to pull apart the longitudinal edges 608, 609 of the multilayer film 100 along the fin seal 630 to thereby open the pouch package 600. For example, the first longitudinal edge 608 may be grasped in one hand, the second longitudinal edge 609 may be grasped in the other hand, and the longitudinal edges 608, 609 pulled away from each other. Thus, the force F1 may be applied to both of the first and second longitudinal edges 608, 609 of the multilayer film 100.

Referring to FIG. 7B, as previously described, upon applying the initial opening force F1 to the longitudinal edges 608, 609 of the multilayer film 100, Layer A of the multilayer film 100 may fail in a direction generally perpendicular to the film top facial surface 102 of the multilayer film 100 (e.g., in the +/−X direction as shown in FIG. 7B) at the interface 160, which is at the transition point between the fin seal 630 and the tab 640. Layer B may then cohesively fail in a direction generally parallel to the film top facial surface 102 of the multilayer film 100 (e.g., in the +/−Z direction as shown in FIG. 7B). Cohesive failure of Layer B of the multilayer film 100 may result in the first portion 162 of the composition of Layer B coupled to the bottom facial surface 114 of Layer A and the second portion 164 of the composition of Layer B coupled to the top facial surface 132 of Layer C. FIG. 7B shows Layer A and Layer B of the multilayer film 100 at the second longitudinal edge 609 as failing during initial opening of the pouch package 600. However, it is understood that the Layer A and Layer B of the multilayer film 100 on the first longitudinal edge 608 may fail during initial opening of the pouch package 600. Continued application of the opening force F1 to the fin seal 630 may also cause initial opening of the multilayer film 100 at the first end seal 610, second end seal 620, or both.

The pouch package 600 may be reclosed by returning the first portion 162 of the composition of Layer B into contact with the second portion 164 of the composition of Layer B along the fin seal 630 and/or the first or second end seal 610, 620. A reclose pressure may be applied to the multilayer film 100 from both sides of the fin seal 630 (and/or end seals 610, 620) to adhere the first portion 162 and the second portion 164 of the composition of Layer B together to reclose and reseal the pouch package 600 along the fin seal 630 (and/or end seals 610, 620). The pouch package 600 may be reopened by again applying a force to pull the multilayer film 100 apart again at the fin seal 630 or end seals 610, 620. The pouch package 600 may be reclosed and reopened through a plurality of reclose/reopen cycles.

Initial opening and reclosing has been described in the context of a pouch package 600 that includes the multilayer film 100 at both longitudinal edges 608, 609; however, principles of operation of opening and reclosing the pouch package 600 are the same if a single strip of the multilayer film 100 is applied at only the first longitudinal edge 608 or the second longitudinal edge 609 of the sheet 601. After sealing the multilayer film 100 along the fin seal 630 at a sealing temperature of equal to or greater than 130° C., the multilayer film 100 may exhibit an initial opening force F1 of less than 40 N/inch, less than 37 N/inch, less than 35 N/inch, or less than 30 N/inch and a reopen force of greater than or equal to 2.0 N/inch, greater than 2.5 N/inch, or even greater than 3.0 N/inch after at least 4 reclose/reopen cycles.

The initial opening force F1 to initially open the pouch package 600 and activate the reclose/reopen functionality and the reopen force to reopen the pouch package 600 after reclosing may be controlled by changing the dimensions of the fin seal 630. For example, referring to FIG. 6C, increasing the fin seal height $H_S$ of the fin seal 630 may increase the magnitude of the initial opening force F1 needed to initially open the pouch package 600 by increasing the amount of Layer B that must cohesively fail to initially open the fin seal 630. Likewise, decreasing the fin seal height $H_S$ may decrease the magnitude of the initial opening force F2. Increasing or decreasing the fin seal height $H_S$ may also increase or decrease, respectively, the reopen force needed to reopen the pouch package 600. In some embodiments, the fin seal 630 may have a fin seal height $H_S$ sufficient to prevent inadvertent opening of the fin seal 630 prior to initial opening of the fin seal 630. In some embodiments, the fin seal 630 may have a fin seal height $H_S$ small enough to enable the fin seal 630 to be opened with an initial opening force less than 40 N/inch, less than 37 N/inch, less than 35 N/inch, or less than 30 N/inch. In some embodiments, the fin seal 630 may have a fin seal height $H_S$ less than or equal to 1.0 inches, less than or equal to 0.75 inches, or less than or equal to 0.5 inches, or less than or equal to 0.25 inches.

Changing the fin seal height $H_S$ may be accomplished by increasing or decreasing the overall transverse width of the sheet 601 used to make the pouch package 600. The overall transverse width of the sheet 601 is measured as the transverse distance (i.e., distance in the +/−X direction of the coordinate axis of FIG. 6B) between the first longitudinal edge 608 and the second longitudinal edge 609 of the sheet 601 prior to forming the sheet 601 into the sleeve 602. For example, using a wider sheet 601 (i.e., a sheet 601 having a larger overall transverse width) may enable greater overlap of the multilayer film 100 at the fin seal 630, thereby increasing the fin seal height $H_S$ and the initial opening force F1 needed to open the pouch package 600. The initial opening force F1 needed to open the pouch package 600 may also be controlled by controlling the sealing temperature, sealing pressure, or both used to initial seal the fin seal 630.

Figure 8A:
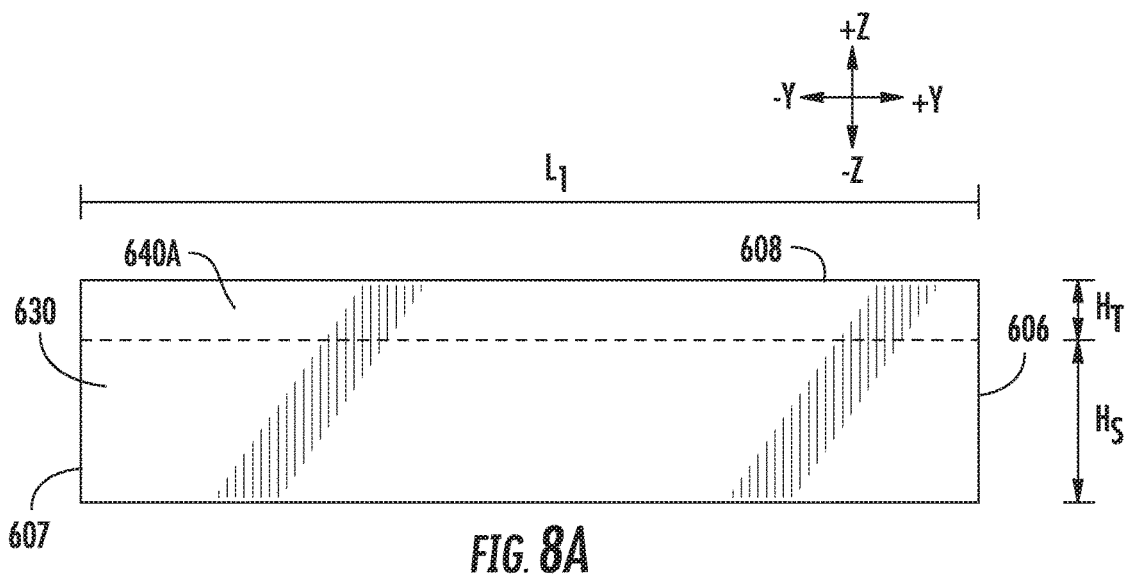
FIG. 8A schematically depicts a side view of an embodiment of a fin seal and a tab for the pouch package of FIG. 6A, in accordance with one or more embodiments of the present disclosure.
Figure 8B:
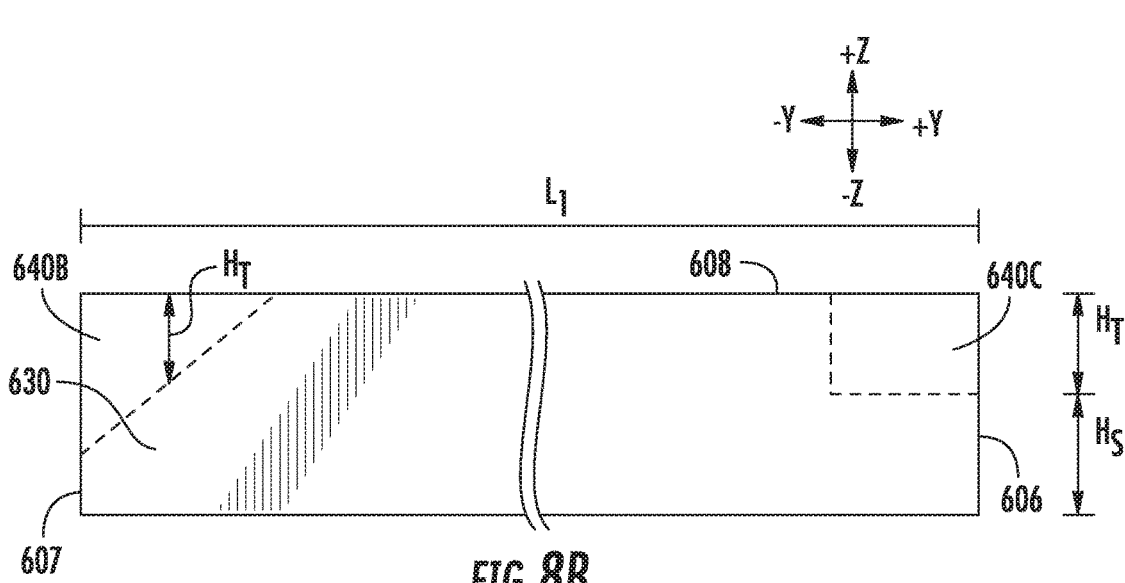
FIG. 8B schematically depicts a side view of another embodiment of a fin seal and a tab for the pouch package of FIG. 6A, in accordance with one or more embodiments of the present disclosure.
Figure 8C:
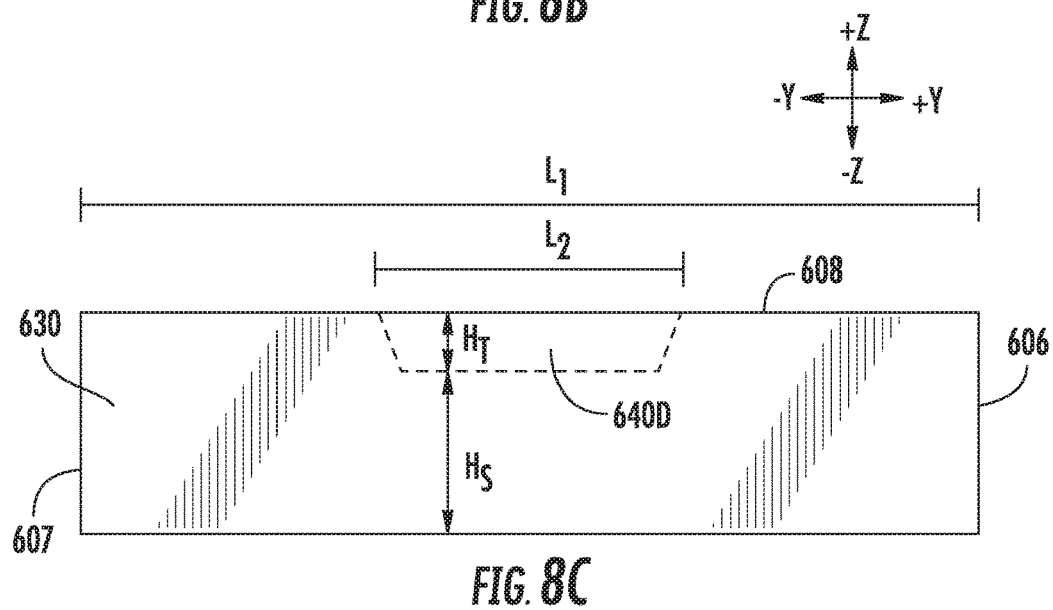
FIG. 8C schematically depicts a side view of yet another embodiment of a fin seal and a tab for the pouch package of FIG. 6A, in accordance with one or more embodiments of the present disclosure.

Referring to FIGS. 8A-8C, the tab 640 may have various shapes and positions relative to the fin seal 630. Referring to FIG. 8A, in some embodiments, the tab 640A may extend the entire longitudinal length L1 of the fin seal 630 from the first end 606 to the second end 607 of the pouch package 600. The tab height $H_T$ of the tab 640A may be the same along the longitudinal length L1 or may vary along the longitudinal length L1 of the fin seal 630. Referring to FIG. 8B, in other embodiments, tab 640B, 640C may be positioned proximal to the first end 606 or the second end 607 of the pouch package 600 and may extend only partially along the longitudinal length L1 of the fin seal 630. As shown in FIG. 8B, tab 640B may have a tab height $H_T$ that changes as a function of position along fin seal 630 (i.e., changes as a function of the +/−Y position of the coordinate axis in FIG. 8B). Alternatively, tab 640C may have a tab height $H_T$ that is constant with respect to the +/−Y position along the fin seal 630. Referring to FIG. 8C, in still other embodiments, the tab 640D may have a tab length L2 that is less than the longitudinal length L1 of the fin seal 630. The tab 640D may be disposed in the middle of the longitudinal length L1 of the fin seal 630 to that the tab 640D is not proximal to the first end 606 or the second end 607 of the pouch package 600. Other shapes, sizes, and configurations of the tab 640 are contemplated.

In alternative embodiments of the pouch package 600, the first longitudinal edge 608 may be overlapped with the second longitudinal edge 609 and sealed so that the film top facial surface 102 of the multilayer film 100 along the first longitudinal edge 608 is in adhering contact with the film bottom facial surface 104 of the multilayer film 100 along the second longitudinal edge 609. In these embodiments, the first longitudinal edge 608 may be sealed to the second longitudinal edge 609 to form a lap seal instead of the fin seal 630 depicted in FIGS. 6A-6C.

Figure 9A:
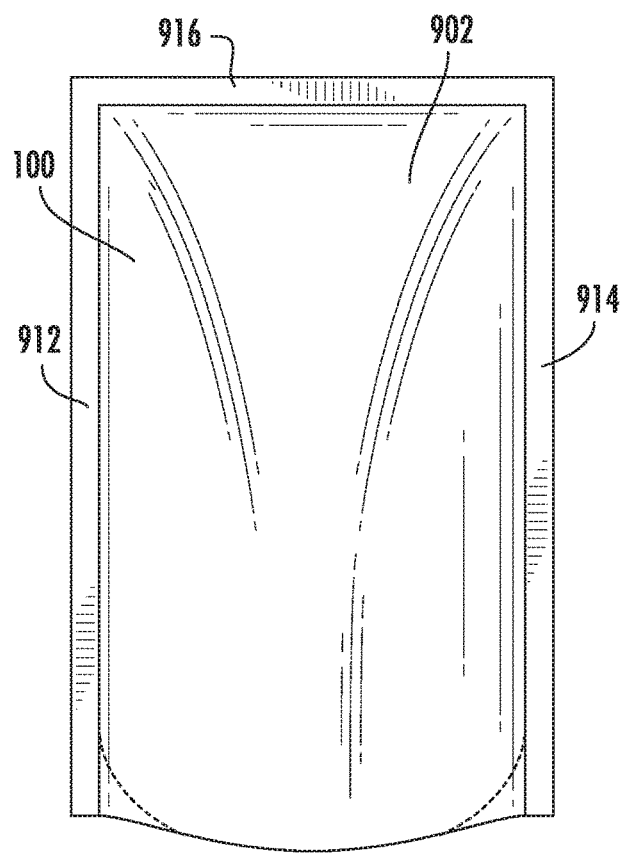
FIG. 9A schematically depicts a front view of an embodiment of a stand-up pouch package that includes the multilayer film of FIG. 1, in accordance with one or more embodiments of the present disclosure.
Figure 9B:
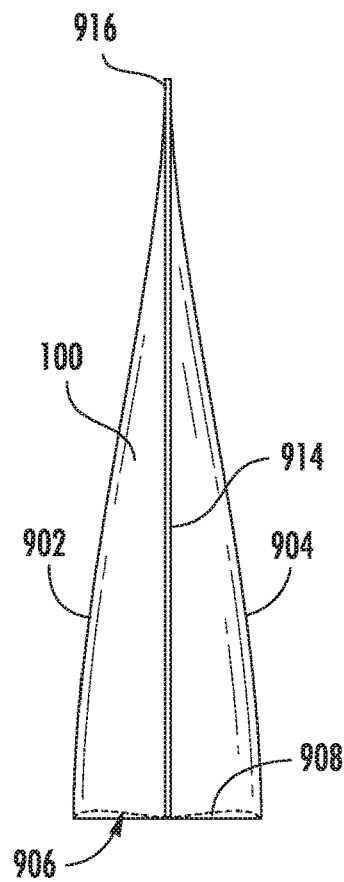
FIG. 9B schematically depicts a side view of the stand-up pouch package of FIG. 9A, in accordance with one or more embodiments of the present disclosure.
Figure 9C:
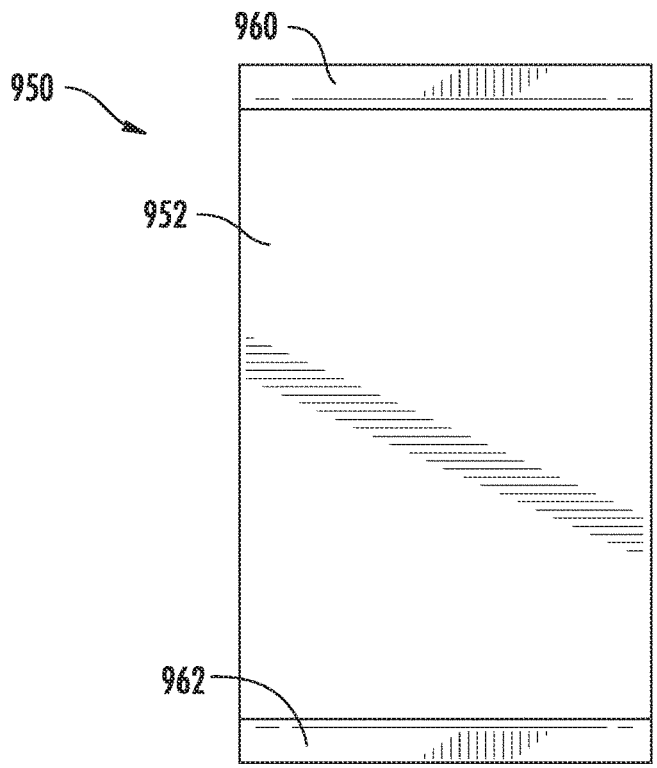
FIG. 9C schematically depicts a front view of an embodiment of a pillow pouch package that includes the multilayer film of FIG. 1, in accordance with one or more embodiments of the present disclosure.

Referring now to FIGS. 9A-9C, the multilayer film 100 disclosed herein may be used in making various other pouch packages, such as stand-up pouch 900 in FIGS. 9A and 9B and pillow pouch 950 in FIG. 9C. Referring now to FIGS. 9A and 9B, the stand-up pouch 900 may include a first side 902, a second side 904, and a bottom 906 extending between the first side 902 and the second side 904. The bottom 906 may include a gusset 908 to provide a contoured bottom to the stand-up pouch 900. The first side 902 may be coupled to the second side 904 along a first edge seal 912, a second edge seal 914, and a top edge seal 916. In some embodiments, the first side 902 may be coupled to the second side 904 by heat sealing or other sealing process.

In some embodiments, one or more than one of the first side 902, the second side 904, or the bottom 906 of the stand-up pouch 900 may be made from the multilayer film 100. In these embodiments, the multilayer film 100 may be oriented so that Layer A (FIG. 1) and the film top facial surface 102 (FIG. 1) may face inward towards the internal volume of the stand-up pouch 900. Thus, the film top facial surface 102 may define at least a portion of the internal volume of the stand-up pouch 900. Layer C and the film bottom facial surface 104 may face outward, away from the internal volume of the stand-up pouch 900. In some embodiments, Layer C of the multilayer film may comprise the outer surface of the first side 902, the second side 904, and/or the bottom 906 of the stand-up pouch 900.

The sealing composition of Layer A of the multilayer film 100 may be sealed to (i.e., in adhering contact with) the inner surface of the opposite side of the stand-up pouch 900 along the first edge seal 912, the second edge seal 914, and/or the top edge seal 916. The multilayer film 100 may be initially opened at the first edge seal 912, the second edge seal 914, and/or the top edge seal 916 to activate the reclose/reopen functionality of the multilayer film 100. In some embodiments, the first side 902 and the second side 904 may be made from a flexible film and strips of the multilayer film 100 may be disposed between the first side 902 and the second side 904 of the stand-up pouch 900 along the first edge seal 912, the second edge seal 914, and/or the top edge seal 916.

Referring to FIG. 9C, pillow pouch 950 may include a first side 952 and a second side (not shown). The first side 952, the second side, or both may include the multilayer film 100. The multilayer film 100 may be oriented with Layer A (FIG. 1) and the film top facial surface 102 (FIG. 1) of the facing inward toward the other side of the pillow pouch 950 (i.e., the first side 952 or second side). The film bottom facial surface 104 of the multilayer film 100 may face outward to form an outer surface of the pillow pouch 950. The first side 952 and the second side may be sealed together along the sealed region 154, which may be proximal to the outer edges of the first side 952 and the second side.

Figure 10A:
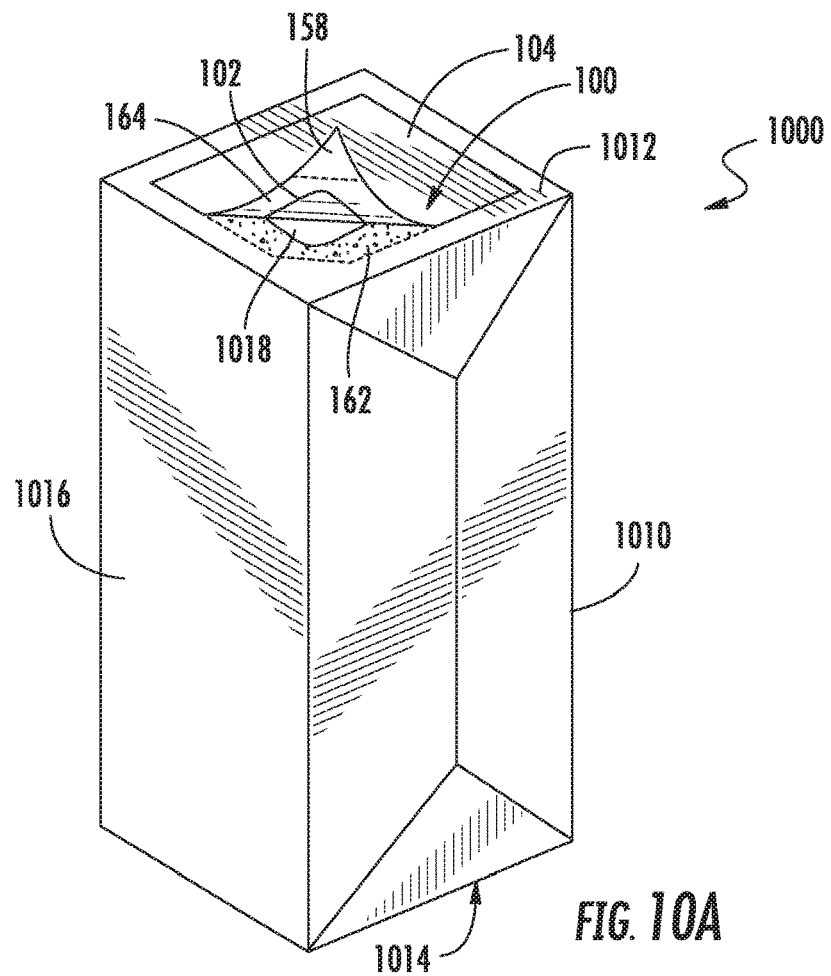
FIG. 10A schematically depicts a front perspective view of an embodiment of a reclosable box that includes the multilayer film of FIG. 1, in accordance with one or more embodiments of the present disclosure.
Figure 10B:
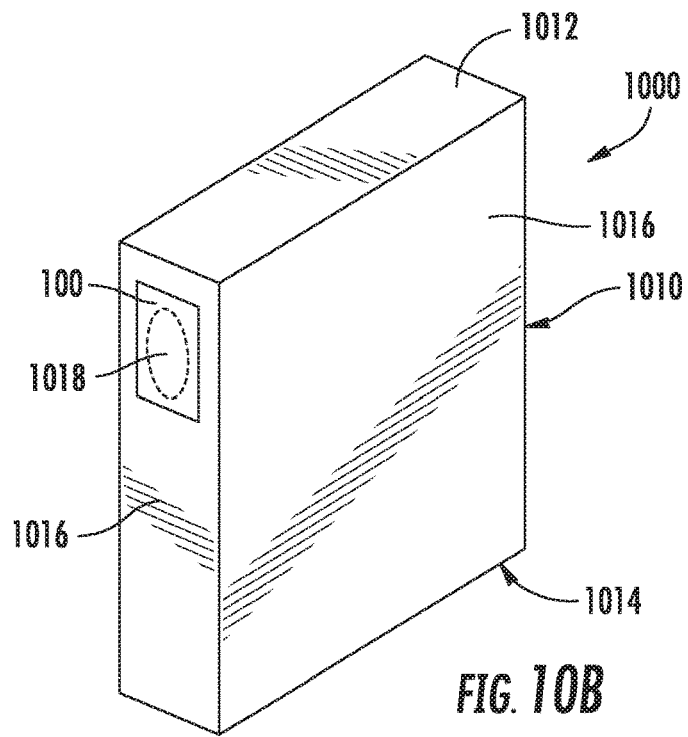
FIG. 10B schematically depicts a front perspective view of another embodiment of a reclosable box that includes the multilayer film of FIG. 1, in accordance with one or more embodiments of the present disclosure.

Referring now to FIGS. 10A and 10B, the multilayer film 100 disclosed herein may be used in conjunction with box packaging to make a reclosable box 1000. The reclosable box 1000 may include a box 1010 comprising a top panel 1012, a bottom panel 1014, and a plurality of side panels 1016 extending from the bottom panel 1014 to the top panel 1012. The box 1010 may be made from a rigid or semi-rigid material, such as fiberboard, cardboard, corrugated cardboard, rigid plastic, metal, ceramic, other rigid materials, or combinations of these. The top panel 1012, bottom panel 1014, and plurality of side panels 1016 may define an internal volume of the reclosable box 1000. Referring to FIG. 10A, in some embodiments, the top panel 1012 may include an opening 1018 from which to dispense the contents of the reclosable box 1000.

The reclosable box 1000 may include the multilayer film 100 positioned to cover the opening 1018 in the top panel 1012 and sealed to the top panel 1012 to cover the opening 1018. The multilayer film 100 may be oriented so that Layer A (FIG. 1) and the film top facial surface 102 may face inward towards the top panel 1012 so that the film top facial surface 102 contacts the top panel 1012 of the reclosable box 1000. Layer C and the film bottom facial surface 104 of the multilayer film 100 may face outward, away from the top panel 1012 of the reclosable box 1000.

Referring to FIG. 10A, the multilayer film 100 may be heat sealed or otherwise adhered to an outer surface 1022 of the box 1010 proximal to and surrounding the perimeter of the opening 1018 of the box 1010. The multilayer film 100 may be sealed to the box 1010 before or after folding the box into its final shape. The sealed region 154 of the multilayer film 100 may include regions of the multilayer film 100 for which the film top facial surface 102 is in adhering contact with the outer surface 1022 of the box 1010. The unsealed region 156 of the multilayer film 100 may include the portion of the multilayer film 100 covering the opening 1018 of the box 1010. The multilayer film 100 may include the tab 158 for initially opening and reopening the multilayer film 100. At the tab 158, the film top facial surface 102 of the multilayer film 100 is not adhered or sealed to the outer surface 1022 of the box 1010.

The reclosable box 1000 may be opened by initially opening the multilayer film 100. As previously described, the multilayer film 100 may be opened by introducing an initial opening force to the multilayer film 100 in a direction away from the outer surface 1022 of the box 1010. For example, the tab 158 may be used to pull the multilayer film 100 in a direction away from the outer surface 1022 of the box 1010. Layer A may break at the edge of the tab 158 and Layer B may cohesively fail in the sealed region 154, leaving the first portion 162 of the composition of Layer B on the bottom facial surface 114 of Layer A and the second portion 164 of the composition on the top facial surface 132 of Layer C. Layer A may remain sealed to the outer surface 1022 of the box 1010 in the sealed region 154 as Layer C and the second portion 164 of the composition is pulled away from the box 1010. As the initial opening force continues to be applied, Layer A may break at the interface of the sealed region 154 and the unsealed region 156 to uncover the opening 1018 of the box 1010.

Initially opening the multilayer film 100 may activate the reclose/reopen functionality of the multilayer film 100. The multilayer film 100 may be reclosed by returning the multilayer film 100 to its original position with the second portion 164 of the composition of Layer B in contact with the first portion 162 of the composition in the sealed region 154 and applying a reclose pressure to the multilayer film 100. The multilayer film 100 may be reopened and reclosed through multiple reclose cycles to open and close the reclosable box 1000.

Referring to FIG. 10B, in other embodiments, the opening 1018 may be positioned in one of the side panels 1016 of the box 1010. In this configuration, the multilayer film 100 may be adhered or sealed to the side panel 1016 surrounding the opening 1018. Although the reclosable box 1000 is described herein in the context of the multilayer film 100 with three layers, it is understood that multilayer films incorporating the compositions disclosed herein and having more than three layers, such as multilayer film 200 for example, may also be used to make the reclosable box 1000.

FIGS. 5A-10B illustrate only a few examples of reclosable package designs that can incorporate the multilayer film 100 and compositions according to embodiments of the present disclosure. A person of ordinary skill in the art can readily identify other package types, shapes, and sizes in which the multilayer film and composition disclosed herein may be incorporated. For example, the multilayer film and/or compositions may be incorporated into package shapes and sizes for which zippers or other mechanical means have been used to provide reclosability to the package. Additionally, the multilayer films and compositions may be incorporated into a broad range of package types and shapes that include at least one flexible film. Examples of these packaging types may include, but are not limited to tray packaging; pouch packaging such as pillow pouches, vertical form fill and seal (VFFS) packaging, horizontal form fill and seal packages, stand-up pouches, or other pouches; bags; boxes; or other type of packaging. The reclosable films and compositions may be incorporated into primary packaging or secondary packaging, such as overwraps, bags, or other secondary packaging. Other packaging types, shapes and sizes having the reclosable film and/or compositions disclosed herein are also contemplated.

In some embodiments, the reclosable packaging disclosed herein may be used to package food products, beverages, consumer goods, personal care items, or other articles. Food products that may be packaged using the reclosable packaging disclosed herein may include particular food products, such as sugar, spices, flour, coffee, or other particulates; solid food products; such as meats, cheeses, snacks, vegetables, baked goods, pet food, pasta, or other solid food products; liquid food products, such as but not limited to milk, soup, beverages, or other liquid food products; and/or bulk food items such as but not limited to rice, dog food, flour or other grains, or other bulk food items. Consumer goods that may be packaged using the reclosable packaging may include but are not limited to consumer electronics, hardware, toys, sporting goods, plastic utensils, autoparts, batteries, cleaning supplies, software packages, salt, or other consumer goods. The reclosable packages disclosed herein may also be incorporated into post-consumer storage bags, such as food storage bags or freezer bags. A person of ordinary skill in the art can recognize many other potential uses for the reclosable packaging disclosed herein.

Test Methods

Density

Density is measure in accordance with ASTM D792 and reported in grams/cubic centimeter (g/cc or g/cm$^3$).

Melt Index

Melt index ($I_2$), is measured in accordance with ASTM D1238-10, under conditions of 190° C. and 2.16 kg of load. The melt index ($I_2$) is reported in grams eluted per 10 minutes (g/10 min).

Differential Scanning Calorimetry (DSC)

DSC can be used to measure the melting, crystallization, and glass transition behavior of a polymer over a wide range of temperature. The DSC analysis may be performed on a TA Instruments Q1000 DSC, equipped with a refrigerated cooling system (RCS) and an autosampler is used to perform the analysis. During testing, a nitrogen purge gas flow of 50 ml/min is used. Each sample is melt pressed into a thin film at about 175° C. The melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 230° C. and held isothermal for 5 minutes in order to remove its thermal history. Next, the sample is cooled to −90° C. at a 10° C./minute cooling rate and held isothermal at −90° C. for 5 minutes. The sample is then heated to 230° C. (this is the "second heat" ramp) at a 10° C./minute heating rate. The cooling and second heating curves are recorded. The values determined are extrapolated onset of melting, Tm, and extrapolated onset of crystallization, Tc. Heat of fusion ($H_f$) (in Joules per gram), and the calculated % crystallinity for polyethylene samples using the Equation below:

$$\% \text{ Crystallinity} = ((H_f)/292(J/g)) \times 100$$

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in B. Wunderlich in Thermal Characterization of Polymeric Materials, 2$^{nd}$ edition, Academic Press, 1997, E. Turi ed., pgs 277 and 278. The crystallization temperature, Tc, is determined from a DSC cooling curve as above except the tangent line is drawn on the high temperature side of the crystallization peak. Where this tangent intersects the baseline is the extrapolated onset of crystallization (Tc). Glass transition temperature, Tg, is determined from the DSC heating curve where half the sample has gained the liquid heat capacity as described in B. Wunderlich in Thermal Characterization of Polymeric Materials, 2$^{nd}$ edition, Academic Press, 1997, E. Turi ed., pg 278 and 279. Baselines are drawn from below and above the glass transition region and extrapolated through the Tg region. The temperature at which the sample heat capacity is half-way between these baselines is the Tg.

Dynamic Mechanical Spectroscopy (DMS) for Polymers and Formulations

Dynamic Mechanical Spectroscopy (DMS) is performed on compression molded disks formed in a hot press at 180° C. at 10 MPa pressure for 5 minutes, and then water cooled in the press at 90° C./min. DMS testing is conducted using an Advance Rheometric Expansion System (ARES) controlled strain rheometer equipped with dual cantilever fixtures for torsion testing, which is available from TA Instruments.

For polymer testing, a 1.5 mm plaque is pressed, and cut in a bar of dimensions 32×12 mm (test sample). The test sample is clamped at both ends between fixtures separated by 10 mm (grip separation AL), and subjected to successive temperature steps from −100° C. to 200° C. (5° C. per step). At each temperature, the torsion modulus G' is measured at an angular frequency of 10 rad/s, the strain amplitude being maintained between 0.1 percent and 4 percent, to ensure that the torque is sufficient and that the measurement remained in the linear regime.

An initial static force of 10 g is maintained (auto-tension mode) to prevent slack in the sample when thermal expansion occurred. As a consequence, the grip separation AL increases with the temperature, particularly above the melting or softening point of the polymer sample. The test stops at the maximum temperature or when the gap between the fixtures reaches 65 mm.

For PSA formulation testing, constant temperature frequency sweeps using a TA Instruments (ARES) equipped with 8 mm parallel plates geometry under a nitrogen purge. Frequency sweeps are performed at 150° C. and 190° C. for all the samples at a gap of 2.0 mm and at a constant strain of 10%. The frequency interval is 0.1 to 100 radians/seconds. The stress response is analyzed in terms of amplitude and phase, from which the storage modulus (G'), loss modulus (G") and dynamic melt viscosity (eta*, or $\eta^*$) are calculated.

Constant frequency temperature sweeps are performed using a TA Instruments ARES strain rheometer equipped with 8 mm parallel plates geometry under a nitrogen purge. Temperature sweeps are performed at 1 Hz frequency, from −40° C. to 200° C. for all the samples at a gap of 2.0 mm and at a constant strain of 10%. The frequency interval is 0.1 to 100 radians/seconds. The stress response is analyzed in terms of amplitude and phase, from which the storage modulus (G'), loss modulus (G") and dynamic melt viscosity (eta*, or $\eta^*$) are calculated.

Peel Adhesion Test

The adhesion test follows the general framework of PSTC-101 test method A from the Pressure Sensitive Tape Council (PSTC). This is a 180° angle peel, at 305 mm/minute, against some surface of interest. In this case, the film layer adjacent to the adhesive layer, where reclose functionality is designed to exist, is the surface of interest. Flexible film samples are fixed to a stainless steel panel using masking tape [PET/solventless adhesive/core (3 layers)/PSA/sealant/sealant/PSA/core (3 layers)/solventless adhesive/PET/fixed to panel with masking tape at one free end (sealant/PSA/core (3 layers)/solventless adhesive/PET) of the test specimen; the adhesive on the masking tape is in contact with the sealant layer of the free end of the test specimen]. A second piece of masking tape is used to fix the folded end of the test specimen to the panel; here, the tape is placed approximately 10 mm from the fold [masking tape/PET/solventless adhesive/core (3 layers)/PSA/sealant/sealant/PSA/core (3 layers)/solventless adhesive/PET/fixed to panel with masking tape; the adhesive on the masking tape is in contact with the upper PET layer of the folded end of the test specimen.] The other free end of the test specimen is peeled at 180° from the fixed free end of the test specimen, causing a break within the PSA for Examples 1-5 and at the PSA-core interface for Comparative Examples 1 and 2 [Free end: PET/solventless adhesive/core (3 layers)/-BREAK-PSA/sealant/sealant/PSA/core (3 layers)/solventless adhesive/PET-panel], and giving a force value.

An INSTRON 5564, running BLUEHILL 3 software, is used to collect the peel data. All samples are equilibrated to standard conditions, 23° C. and 50% RH. Testing is conducted in standard conditions as well. The peak force is recorded for five test samples of each laminated film, and averaged. After the first peel, the specimen is reclosed using the standard roller conditions given in the PSTC test method for sample lamination. The standard dwell time between rolling/sealing the specimen and testing/peeling the specimen is 20 minutes, but several longer dwells are performed to test the PSA's recovery and are indicated in Table 5 (23° C. and 50% RH). The specimen is reclosed 10 times or until the force could no longer be measured. The adhesion results are shown in Table 5. The PSA failure modes are recorded as "C" meaning cohesive failure through PSA layer and "A" meaning adhesive delamination between PSA and adjacent layer.

EXAMPLES

The following Examples illustrate various embodiments of the composition and multilayer film described herein. The compositions of the following examples and comparative examples were compounded using a single stage twin-screw extrusion process. The compounding operation is performed on a Century-ZSK-40 45.375 length-to-diameter ratio (L/D) (Eleven Barrels) extruder using one screw design with one oil injector, in barrel 4. The extruder has a maximum screw speed of 1200 rpm. The polymers and the PICCOTAC tackifier were fed into the main feed throat of the extruder. The HYDROBRITE 550 process oil is added through an injection port at barrel 4. The compound is pelletized using an underwater Gala system, which is equipped with a 12 hole (2.362 mm hole diameter) Gala die with 6 holes plugged, and a 4 blade hub cutter. Soap and antifoam were added to the water bath as needed to prevent clumping. The pellets were collected and dusted with 2000 ppm POLYWAX 2000 (available from Baker Hughes), and then dried under nitrogen purge for 24 hours. Screw speed is set at 180 RPM for all the samples. Temperature profile is set as follows: 100° C. (zone 1), 100° C. (zone 2), 180° C. (zone 3), 180° C. (zone 4), 160° C. (zone 5), 160° C. (zone 6), 110° C. (zone 7), 110° C. (zone 8), 90° C. (zone 9), 90° C. (zone 10), and 90° C. (zone 11), with a die temperature of 140° C.

Table 1 below includes properties of commercial polymers used in the Examples that follow.

TABLE 1

Properties of commercial polymers

| Material | Melt Index ($I_2$) g/10 min | Density (g/cc) | Supplier |
|---|---|---|---|
| INFUSE ™ 9107 (olefin block copolymer) | 1.00 | 0.866 | The Dow Chemical Company, Midland, MI |
| DOW ™ LDPE 5004i (LDPE) | 4.20 | 0.924 | The Dow Chemical Company, Midland, MI |

TABLE 1-continued

Properties of commercial polymers

| Material | Melt Index (I$_2$) g/10 min | Density (g/cc) | Supplier |
|---|---|---|---|
| DOWLEX ™ NG 2038.68G (LLDPE) | 1.00 | 0.935 | The Dow Chemical Company, Midland, MI |
| ENGAGE ™ 8842 (polyolefin plastomer) | 1.00 | 0.857 | The Dow Chemical Company, Midland, MI |
| VECTOR ® 4113A (styrene-isoprene triblock copolymer) | 9.20 | 0.920 | Dexco Polymers, Houston, TX |
| VECTOR ® 4213A (SIS triblock/SI diblock copolymer) | 12.0 | 0.940 | Dexco Polymers, Houston, TX |
| ELVAX ® 3124 (ethylene-vinyl acetate copolymer w/ 9 wt. % vinyl acetate) | 7.0 | 0.930 | E.I. du Pont de Nemours and Company, Inc. |

Example 1: Example Composition

A composition according to the present disclosure was made by combining 43.4 wt. % ethylene/α-olefin random copolymer, 20 wt. % styrenic block copolymer, 30 wt. % tackifier, and 6.6 wt. % mineral oil. The ethylene/α-olefin random copolymer was ENGAGE 8842. The styrenic block copolymer was VECTOR 4113A styrene-isoprene triblock copolymer, which had a styrene content of 18 wt. %, and a diblock content of 42 wt. %. The tackifier was PICCOTAC 1100 C$_5$ tackifier available from Eastman Chemical Company. The tackifier has a ring and ball softening point of 100° C. and a Mw of 2900. The mineral oil was HYDROBRITE 550 mineral oil available from Sonneborn and exhibited a density of 0.87 g/cm$^3$ and paraffinic carbon content of about 70 wt. %.

The individual constituents of the composition of Example 1 were compounded according to the previously described single stage twin-screw extrusion process. The composition of Example 1 was then tested for density, melt index (I$_2$) at a temperature of 190° C. and a load of 2.16 kg, and melt flow rate at a temperature of 230° C. and a load of 2.16 kg. The results for the density, melt index (I$_2$), and melt flow rate for the composition of Example 1 are provided below in Table 2.

Comparative Example 2: Comparative Adhesive Composition Formulated with Olefin Block Copolymer In Comparative Example 2, a comparative adhesive composition was produced using an olefin block copolymer in place of the ethylene/α-olefin random copolymer of Example 1. The composition of Comparative Example 2 included 43.4 wt. % olefin block copolymer, 20 wt. % of the styrenic block copolymer, 30 wt. % tackifier, and 6.6 wt. % mineral oil. The olefin block copolymer was INFUSE™. The styrenic block copolymer, tackifier, and mineral oil in Comparative Example 2 were the same as described above for Example 1.

The individual constituents of Comparative Example 2 were compounded using the previously described single stage twin-screw extrusion process. The composition of Comparative Example 2 was tested for density, melt index (I$_2$) at a temperature of 190° C. and a load of 2.16 kg, and melt flow rate at a temperature of 230° C. and a load of 2.16 kg. The results for the density, melt index (I$_2$), and melt flow rate for the composition of Comparative Example 2 are provided below in Table 2.

Comparative Example 3: Comparative Adhesive Composition Formulated with a Lesser Amount of Olefin Block Copolymer In Comparative Example 3, a comparative adhesive composition was produced using an olefin block copolymer in place of the ethylene/α-olefin random copolymer of Example 1. The composition of Comparative Example 3 included less olefin block copolymer and more styrenic block copolymer compared to the composition of Comparative Example 2.

Comparative Example 3 was prepared to investigate the effect of increasing the amount of the styrenic block copolymer in the adhesive composition.

The composition of Comparative Example 3 included 33.4 wt. % olefin block copolymer, 30 wt. % of the styrenic block copolymer, 30 wt. % tackifier, and 6.6 wt. % mineral oil. The olefin block copolymer was INFUSE™ 9107. The styrenic block copolymer, tackifier, and mineral oil were the same as described above for Example 1.

The individual constituents of Comparative Example 3 were compounded using the previously described single stage twin-screw extrusion process. The composition of Comparative Example 3 was tested for density, melt index (I$_2$) at a temperature of 190° C. and a load of 2.16 kg, and melt flow rate at a temperature of 230° C. and a load of 2.16 kg. The results for the density, melt index (I$_2$), and melt flow rate for the composition of Comparative Example 3 are provided below in Table 2.

Comparative Example 4: Commercially Available Adhesive Composition for Reclose Multilayer Films For Comparative Example 4, a commercially available pressure sensitive adhesive composition marketed as providing reclose capability to multilayer film compositions was obtained. The commercially available composition comprised a styrene-isoprene-styrene block copolymer, hydrocarbon tackifier, and talc. The commercially available composition did not include a polyethylene component, such as a polyethylene/α-olefin copolymer. The commercially available adhesive composition was tested for density, melt index (I$_2$) at a temperature of 190° C. and a load of 2.16 kg, and melt flow rate at a temperature of 230° C. and a load of 2.16 kg. The results for the density, melt index (I$_2$), and melt flow rate for the composition of Comparative Example 4 are provided below in Table 2.

Comparative Example 5: Comparative Adhesive Composition Formulated with Styrenic Block Copolymer, Tackifier, and Oil In Comparative Example 5, a comparative adhesive composition was produced using a styrenic block copolymer without the ethylene/α-olefin random copolymer of Example 1. The composition of Comparative Example 5 included 64.3 wt. % styrenic block copolymer, 30 wt. % tackifier, and 6.6 wt. % mineral oil. The styrenic block copolymer was VECTOR® 4213A SIS triblock/SI diblock copolymer. The tackifier and mineral oil were the same as described above for Example 1.

The individual constituents of Comparative Example 5 were compounded using the previously described single stage twin-screw extrusion process. The composition of Comparative Example 5 was tested for density, melt index ($I_2$) at a temperature of 190° C. and a load of 2.16 kg, and melt flow rate at a temperature of 230° C. and a load of 2.16 kg. The results for the density, melt index ($I_2$), and melt flow rate for the composition of Comparative Example 5 are provided below in Table 2.

Comparative Example 6: Comparative Adhesive Composition Formulated with EVA and Styrenic Block Copolymer In Comparative Example 6, a comparative adhesive composition was produced using an ethylene-vinyl acetate copolymer (EVA) in place of the ethylene/α-olefin random copolymer of Example 1. The composition of Comparative Example 6 included 20.0 wt. % EVA, 43.4 wt. % styrenic block copolymer, 30 wt. % tackifier, and 6.6 wt. % mineral oil. The EVA was ELVAX® ethylene-vinyl acetate copolymer having 9 wt. % vinyl acetate. The styrenic block copolymer, tackifier, and mineral oil were the same as described above for Example 1.

The individual constituents of Comparative Example 6 were compounded using the previously described single stage twin-screw extrusion process. The composition of Comparative Example 6 was tested for density, melt index ($I_2$) at a temperature of 190° C. and a load of 2.16 kg, and melt flow rate at a temperature of 230° C. and a load of 2.16 kg. The results for the density, melt index ($I_2$), and melt flow rate for the composition of Comparative Example 6 are provided below in Table 2.

Example 7: Comparison of Properties of the Compositions of Example 1 and Comparative Examples 2-6

Table 2, which is provided below, includes the density, melt index ($I_2$), and melt flow rate for the composition of Example 1 and the adhesive compositions of Comparative Examples 2-6.

TABLE 2

Properties of the composition of Example 1 compared to the properties of the adhesive compositions of Comparative Examples 2-4

| Example | Density (g/cm³) | Melt Index (I2) (g/10 min) | MFR (230° C./2.16 kg) |
| --- | --- | --- | --- |
| Ex. 1 | 0.904 | 10.0 | 32.5 |
| Comp. Ex. 2 | 0.907 | 8.6 | 26.3 |
| Comp. Ex. 3 | 0.913 | 13.8 | 53.7 |
| Comp. Ex. 4 | >0.920 | 56.5 | N/A |
| Comp. Ex. 5 | 0.942 | 20.4 | 127.6 |
| Comp. Ex. 6 | 0.933 | 44.1 | 151.1 |

The composition of Example 1 and the adhesive compositions of Comparative Examples 2, 3, 5, and 6 were additionally tested using DSC to determine the melting curves of the compositions, from which the crystallization temperatures (Tc ° C.), melt temperature (Tm ° C.), glass transition temperature (Tg ° C.), heat of crystallization (ΔHc joules/gram (J/g)), and heat of melting (ΔHm J/g) for each composition, in accordance with the testing procedure previously described herein. These properties are provided below in Table 3. The composition of Example 1 and the adhesive compositions of Comparative Examples 2, 3, 5, and 6 were additionally testing using DMS to determine the dynamic melt viscosity (η* millipascal seconds (mPa-s)) at 150° C., the ratio of the dynamic melt viscosity at 0.1 radians per second to the dynamic melt viscosity at 100 radians per second at a temperature of 150° C. (η* ratio at 150° C.), and the storage modulus (G' @ 25° C. dyne/cm²) for each composition, according to the DMS testing procedure previously described herein. The results of the DMS testing are provided below in Table 3. The composition of Example 1 was tested two times, and the results reported in Table 3 below as Ex. 1-A and 1-B.

TABLE 3

Melt temperature, crystallization temperature, dynamic melt viscosity, and storage modulus data for the compositions of Example 1 and Comparative Examples 2-6

|  | Ex. 1-A | Ex. 1-B | Comp. 2 | Comp. 3 | Comp. 5 | Comp. 6 |
| --- | --- | --- | --- | --- | --- | --- |
| $T_{c1}$ (° C.) | 16.5 | 17.2 | 101.6 | 101.5 | — | 78.8 |
| $T_{c2}$ (° C.) | — | — | — | — | — | 52.1 |
| $\Delta H_c$ (J/g) | 16.3 | 14.9 | 22.0 | 19.5 | — | 17.0 |
| $T_g$ (° C.) | −54.55 | −53.7 | −52.2 | −53.1 | −54.7 | −52.0 |
| $T_{m1}$ (° C.) | 42.2 | 43.2 | 119.3 | 119.0 | — | 93.0 |
| $\Delta H_m$ (J/g) | 16.9 | 18.1 | 18.6 | 16.4 | — | — |
| η* (mPa-s) 150° C. | $4.0 \times 10^6$ | $3.3 \times 10^6$ | $3.3 \times 10^6$ | $3.1 \times 10^6$ | $7.9 \times 10^6$ | $2.0 \times 10^6$ |
| η* ratio at 150° C. | 8.9 | 7.7 | 17.5 | 17.0 | 64.9 | 11.8 |

As shown in Table 3 above, the composition of Examples 1-A and 1-B exhibited a lower crystallization temperature and melt temperature profile compared to the adhesive compositions of Comparative Examples 2, 3, 5, and 6. Without being bound by theory, it is believed that lower crystallization and melting temperatures may reduce or prevent secondary crystallization of the constituents of the composition, which increases the cohesive strength of the composition. Increased cohesive strength may provide lower opening force for the composition and more tackiness, which increases the reclose force. Thus, the lower crystallization and melting temperatures of the composition of Example 1 (Ex. 1-A, 1-B) may reduce or prevent secondary crystallization of the composition, thereby increasing the cohesive strength of the composition compared to the compositions of Comparative Examples 2, 3, 5, and 6. The lower crystallization and melting temperatures of the composition of Example 1 enables the composition of Example 1 to exhibit a greater reclose force compared to the compositions of Comparative Examples 2, 3, 5, and 6.

Additionally, the dynamic melt viscosity ratio ($\eta^*$ ratio) at 150° C. for the composition of Examples 1-A and 1-B were less than the dynamic melt viscosity ratios of Comparative Examples 2, 3, 5, and 6. Without being bound by theory, it is believed that a lower dynamic melt viscosity ratio translates to more consistent behavior in response to different shear rates, such as the different shear rates experienced by the film layer during film fabrication (e.g., blown film extrusion) or sealing conditions. The compositions of Comparative Examples 2, 3, 5, and 6 have greater dynamic melt viscosity ratios, and therefore it is expected to be harder to maintain a stable bubble during blown film extrusion if shear rate changes. Additionally, the adhesive layer made from the compositions of Comparative Examples 2, 3, 5, and 6 could thin out to a greater extent with increases in sealing pressure, which would reduce the thickness of the adhesive layer and reduce the amount of adhesive composition to enable cohesive peeling through the adhesive and packaging resealing. The composition of Examples 1-A and 1-B, which exhibited a reduced dynamic melt viscosity ratio of the compared to the compositions of Comparative Examples 2, 3, 5, and 6, is less sensitive to changes in shear rates, and therefore, the compositions of Examples 1-A and 1-B may be easier to process into the multilayer film and provide more consistent performance over a range of sealing temperatures and pressures compared to the compositions of Comparative Examples 2, 3, 5, and 6.

Example 8: Multilayer Films with the Compositions of Example 1 and Comparative Examples 2-4

In Example 8, each of the composition of Example 1 and adhesive compositions of Comparative Examples 2 and 3 were used to make a multilayer film to evaluate the reclose properties of the compositions. The multilayer films were five-layer films made using blown film extrusion and included Layer A, Layer B, Layer C, Layer D, and Layer E. Layer A was a seal layer comprising 98.4 wt. % DOW LDPE 5004i, 1.0 wt. % AMPACET 10063 antiblock masterbatch available from Ampacet Corporation, and 0.6 wt. % AMPACET 10090 slip masterbatch available from Ampacet Corporation. Layer B included the composition of Example 1 or one of the adhesive compositions of Comparative Examples 2-4. Layers C, D, and E all included identical layers of 100 wt. % DOWLEX 2038.68G LLDPE. The formulations for each multilayer film of Example 8 are provided below in Table 4.

TABLE 4

| Multilayer film formulations for Example 8 | | | |
| --- | --- | --- | --- |
| Ex. | Ex. 8A | Comp. 8B | Comp. 8C |
| Thickness (mil) | 3 | 3 | 3 |
| Layer A | LDPE 5004i | LDPE 5004i | LDPE 5004i |
| Layer B | Ex. 1 | Comp. 2 | Comp. 3 |
| Layer C | DOWLEX 2038.68G | DOWLEX 2038.68G | DOWLEX 2038.68G |
| Layer D | DOWLEX 2038.68G | DOWLEX 2038.68G | DOWLEX 2038.68G |
| Layer E | DOWLEX 2038.68G | DOWLEX 2038.68G | DOWLEX 2038.68G |
| Layer ratio (%) | 10/20/20/20/30 | 10/20/20/20/30 | 10/20/20/20/30 |

The blown film extrusion samples were fabricated using a LABTECH 5-layer blown film line, and each layer was formed at the same temperature of 190° C. The heat seal layer was positioned on the outside of the bubble, and the material was self-wound on uptake rollers. Film fabrication conditions for films 6A-6C are shown in Table 5.

TABLE 5

| Blown film fabrication conditions for making the multilayer films of Example 8 | | | |
| --- | --- | --- | --- |
| Film ID | 6A | 6B | 6C |
| Output (kg/hr) | 30-35 | 17.3 | 17.3 |
| Gauge (micron) | 70 | 76.2 | 76.2 |
| Layflat (cm) | 31.75 | 33.0 | 33.0 |
| Line speed (m/min) | <1.5 | 5.0 | 5.0 |
| Melt temperature (° C.) | | | |
| Extruder 1 | 215° C. | 207 | 207 |
| Extruder 2 | 190° C. | 152 | 152 |
| Extruder 3 | 220° C. | 218 | 218 |
| Extruder 4 | 220° C. | 214 | 214 |
| Extruder 5 | 220° C. | 211 | 211 |
| Melt pressure (megapascals) | | | |
| Extruder 1 | <5500 | 6 | 6 |
| Extruder 2 | <5500 | 7 | 7 |
| Extruder 3 | <5500 | 23 | 23 |
| Extruder 4 | <5500 | 31 | 31 |
| Extruder 5 | <5500 | 21 | 21 |

The multilayer films of Example 8 and shown in Tables 4 and 5 are of good integrity. These multilayer films of Example 8 are flexible films, formed from only coextrudable polymer formulations. These multilayer films can be used for packaging products, and can be processed on conventional film converting equipment.

A fourth film, comparative film 8D, was obtained and evaluated. Comparative film 8D was a commercially-available multilayer film believed to have been made by a blown film process at conditions typical in the blown film industry. The film 8D included a pressure sensitive adhesive layer that was found to include primarily an SIS block copolymer. The film 8D was found to not include a polyethylene copolymer of any kind.

Each of the multilayer film 8A, and comparative films 8B, 8C, and 8D of Example 8 were adhesively laminated to a 48 gauge biaxially oriented polyethylene terephthalate (PET) (available from DuPont Teijin) using MORFREE 403A (solventless adhesive) and co-reactant C411 (solvent-less adhesive) both of which are available from the Dow Chemical Company, Midland Mich., to form a final laminate film structure (sealant/PSA/core (3 layers)/solventless adhesive/PET). The multilayer films of Example 8 were tested for initial peel strength and reclose peel strength according to the peel adhesion test previously described herein. The reclose peel strength for each film was measured at time intervals after the initial opening peel strength. The result for the initial peel strength and subsequent reclose peel strengths for each of film 8A, and comparative films 8B, 8C, and 8D are provided below in table 6. The peel strength measurements are in units of newtons per inch (N/in) in Table 6 below.

TABLE 6

Initial peel adhesion and reclose peel adhesion for the multilayer films of Example 8

| Film ID/ Seal Temp (° C.) Film 6A | Layer B Ex. 1 | Initial Peel Strength (N/in) Time = 0 | Reopen Peel Strength (N/in) | | | | | | | |
|---|---|---|---|---|---|---|---|---|---|---|
| | | | 20 min | 20 min | 20 min | 20 min | 30 min | 20 min | 60 min | 20 min |
| 130 | Ex. 1 | 34.7 | 5.7 | 3.7 | 2.9 | 2.8 | 2.5 | NA | 2.3 | 2.2 |
| 150 | Ex. 1 | 40.5 | 7.7 | 4.7 | 3.9 | 3.1 | 3.1 | NA | 2.7 | 2.4 |
| Comp. 6B | Comp. 2 | Time = 0 | 20 min | 20 min | 20 min | 20 min | 30 min | 20 min | 60 min | 20 min |
| 130 | Comp. 2 | 43.8 | 6.6 | 4.4 | 3.7 | 3.2 | 2.9 | NA | 2.5 | 2.1 |
| 150 | Comp. 2 | 44.5 | 6.9 | 5.5 | 4.6 | 4.0 | 3.3 | NA | 2.6 | 2.4 |
| Comp. 6C | Comp. 3 | Time = 0 | 20 min | 20 min | 20 min | 20 min | 20 min | 50 min | 20 min | 20 min |
| 130 | Comp. 3 | 27.7 | 4.6 | 3.8 | 3.3 | 2.5 | 2.2 | 2.4 | 2.1 | 1.9 |
| 140 | Comp. 3 | 29.0 | 3.9 | 2.9 | 2.0 | 1.8 | 1.8 | 1.4 | 1.4 | 1.3 |
| 150 | Comp. 3 | 30.6 | 3.2 | 2.0 | 1.5 | 1.1 | 1.0 | 1.0 | 0.9 | 0.8 |
| Comp. 6D | Comp. 4 | Time = 0 | 20 min | 20 min | 20 min | 20 min | 20 min | 50 min | 20 min | 20 min |
| 140 | Comp. 4 | 22.6 | 0.3 | 0.2 | 0.1 | 0.1 | 0.1 | 0.1 | 0.1 | 0.1 |
| 150 | Comp. 4 | 18.7 | 1.2 | 0.6 | 0.4 | 0.1 | 0.1 | 0.3 | 0.1 | 0.0 |

As shown in Table 6 above, film 8A, which included the composition of Example 1, exhibited an initial peel strength 34.7 N/in at a heat seal temperature of 130° C. After being heat sealed at a temperature of 130° C. and initially opened, film 8A exhibited a reclose peel adhesion of at least 2.5 N/in through four reclose cycles and a reclose peel adhesion of greater than 2.0 N/in after at least 7 reclose cycles. At a sealing temperature of 150° C., the initial peel adhesion strength of film 8A was 40.5 N/in and the reclose peel adhesion strength was greater than 3 N/in after four reclose cycles and greater than 2.0 after at least 7 reclose cycles.

Comparative film 8D, which was made with the adhesive composition of Comparative Example 4 that included mostly a styrene block copolymer, exhibited an initial peel strength 18.7 N/in at a heat seal temperature of 150° C. After being heat sealed at a temperature of 150° C. and initially opened, comparative film 8D exhibited a reclose peel adhesion of less than 1.0 N/in through four reclose cycles and negligible reclose peel adhesion of less than 0.1 N/in after at least 7 reclose cycles. Thus, at an initial sealing temperature of 150° C., initial peel strength of 40.5 N/in of the film 8A made with the composition of Example 1 was substantially higher than the initial peel strength of the comparative film 8D that included the styrene block copolymer pressure sensitive adhesive (PSA) of Comparative Example 4. Film 8A also exhibited a substantially greater reclose peel strength after 4 cycles and 7 cycles compared to the comparative film 8D that included the styrene block copolymer PSA of Comparative Example 4.

Comparative film 8B included the adhesive composition of Comparative Example 2 for Layer B. The adhesive composition of Comparative Example 2 included 43.4 wt. % of an ethylene/α-olefin block copolymer and 20 wt. % styrenic block copolymer. The film 8A included the composition of Example 1, which comprised 43.4 wt. % of the ethylene/α-olefin random copolymer. Thus, the difference in composition between the composition of Example 1 and the adhesive composition of Comparative Example 2 is the substitution of the ethylene/α-olefin random copolymer in Example 1 for the ethylene/α-olefin block copolymer used in Comparative Example 2. At a sealing temperature of 130° C., film 8A, which included the composition of Example 1, exhibited an initial peel strength of 34.7 N/inch. Comparative film 8B, which included the adhesive composition of Comparative Example 2, exhibited an initial peel strength of 43.8 N/inch. Thus, film 8A resulted in a lower initial peel strength compared to the initial peel strength of comparative film 8B. The reclose peel strength of film 8A after 4 cycles and after 7 cycles was comparable to the reclose peel strength of comparative film 8B that included the adhesive composition of Comparative Example 2. The results measured after heat sealing at 150° C. exhibited a similar comparative relationship to the films prepared at a heat sealing temperature of 130° C. These results for film 8A and comparative film 8B indicate that the film 8A requires a lesser initial opening force compared to comparative film 8B, but would provide equivalent reclose performance. Therefore, film 8A would be easier to initially open compared to comparative film 8B, but would provide equivalent reclose strength to comparative film 8B.

Comparative film 8C included the adhesive composition of Comparative Example 3, which included only 33.4 wt. % of the ethylene/α-olefin block copolymer and 30 wt. % styrenic block copolymer. Thus, Layer B of comparative film 8C had an increased proportion of styrenic block copolymer and decreased amount of ethylene/α-olefin block copolymer compared to Layer B of comparative film 8B and film 8A. As shown by the results in Table 6, increasing the amount of the styrenic block copolymer in Layer B reduces the initial peel strength of the comparative film 8C compared to the initial peel strength of film 8A. However, the increased amount of styrenic block copolymer in Layer B of comparative film 8C was observed to degrade the reclose peel strength performance of comparative film 8C compared to the reclose peel strength of film 8A. The degradation in the reclose peel strength performance of comparative film 8C is more pronounced after sealing comparative example 8C at the seal temperature of 150° C. Although increasing the amount of styrenic block copolymer in Layer B, such as with comparative film 8C, may decrease the initial peel strength and make the film easier to open, increasing the amount of the styrenic block copolymer in Layer B may adversely affect the reclose peel strength, resulting in weaker reclose seal strength and a reduction in the number of reclose cycles possible for the film. Thus, film 8A that included the composition of Example 1 in Layer B may provide better reclose performance compared to the comparative film 8C, which included an increased amount of styrenic block copolymer in Layer B.

Film 8A has a lesser amount of styrenic block copolymer in Layer B compared with comparative films 8C and 8D. Therefore, film 8A may provide reclose functionality to food packaging without impacting the odor and/or taste of the food products packaged therein.

A first aspect of the disclosure may be directed to a composition comprising: (a) an ethylene/α-olefin random copolymer having density of 0.890 g/cm³ or less, a melting point of 100° C. or less, and a melt index from 0.2 g/10 min to 8.0 g/10 min; (b) a styrenic block copolymer comprising from greater than 1 wt % to less than 50 wt % units of styrene; (c) a tackifier; and (d) an oil. The composition exhibits an overall melt index of the composition of from 2 g/10 min to 15 g/10 min.

A second aspect of the present disclosure may include the first aspect in which the composition comprises: (a) from 30 wt % to 65 wt % of the ethylene/α-olefin random copolymer; (b) from 10 wt % to 35 wt % of the styrenic block copolymer; (c) from 20 wt % to 40 wt % of the tackifier; and (d) from greater than 0 wt % to 8 wt % of the oil.

A third aspect of the present disclosure may include the first aspect or the second aspect wherein the ethylene/α-olefin random copolymer has a melt index from 0.5 g/10 min to 1.5 g/10 min.

A fourth aspect of the present disclosure may include the first through third aspects, wherein the ethylene/α-olefin random copolymer is an ethylene/octene copolymer.

A fifth aspect of the present disclosure may include the first through fourth aspects, wherein the styrenic block copolymer is a styrene-isoprene-styrene block copolymer comprising from 15 wt % to 25 wt % styrene.

A sixth aspect of the present disclosure may include the first through fifth aspects, wherein the tackifier is selected from the group consisting of a non-hydrogenated aliphatic C5 resin and a hydrogenated aliphatic C5 resin.

A seventh aspect of the present disclosure may include the first through sixth aspects, wherein the composition has a density from 0.880 to 0.930 g/cm³.

An eighth aspect of the present disclosure may include the first through seventh aspects, wherein, after subjecting the composition to a sealing temperature of from 100° C. to 180° C., the composition exhibits an initial internal cohesion force of less than or equal to 40 N/inch and a reclose cohesion force of greater than 2.0 N/inch after at least 4 reclose cycles.

A ninth aspect of the present disclosure may include the first through eighth aspect, wherein the composition has a dynamic melt viscosity from 1000 Pa-s to 1400 Pa-s determined using DMS at a temperature of 190° C. and a frequency of 1 Hz.

A tenth aspect of the present disclosure may include the first through ninth aspects, wherein the composition has a dynamic melt viscosity of from 3200 Pa-s to 4000 Pa-s determined using DMS at a temperature of 150° C. and a frequency of 1 Hz.

An eleventh aspect of the present disclosure may include the first through tenth aspects, wherein the composition has a dynamic melt viscosity of from 7400 Pa-s to 7800 Pa-s determined using DMS at a temperature of 130° C. and a frequency of 1 Hz.

A twelfth aspect of the present disclosure may include the first through eleventh aspects, wherein the composition has a dynamic melt viscosity of from 12,400 Pa-s to 17,200 Pa-s determined using DMS at a temperature of 110° C. and a frequency of 1 Hz.

A thirteenth aspect of the present disclosure may include the first through twelfth aspects, wherein the ethylene/α-olefin random copolymer comprises from 50 wt. % to 70 wt. % ethylene comonomer units.

A fourteenth aspect of the present disclosure may include any of the first through thirteenth aspects and may be directed to a multilayer film comprising at least 3 layers, each having opposing facial surfaces, wherein: a Layer A comprises a sealant layer; a Layer B comprises the composition of any of the first through eleventh aspects of the present disclosure, wherein a top facial surface of Layer B is in adhering contact with a bottom facial surface of Layer A; and a Layer C comprises a polyolefin, wherein a top facial surface of Layer C is in adhering contact with a bottom facial surface of Layer B.

A fifteenth aspect of the present disclosure may include the fourteenth aspect, further comprising one or more supplemental layers coupled to a bottom facial surface of Layer C.

A sixteenth aspect of the present disclosure may include the first through the fifteenth aspects and may be directed to an article comprising at least one component formed from the compositions of any of the first through the thirteenth aspects.

A seventeenth aspect of the present disclosure may be directed to a package comprising: a substrate; a multilayer film comprising at least 3 layers, each layer having opposing facial surfaces, wherein: a Layer A comprises a sealant layer; a Layer B includes a composition comprising: an ethylene/α-olefin random copolymer having a density less than or equal to 0.890 g/cm³, a melting point of less than or equal to 100° C., and a melt index of from 0.2 g/10 min to 8.0 g/10 min, a styrenic block copolymer comprising from greater than 1 wt. % to less than 50 wt. % units of styrene, a tackifier, and an oil; and a Layer C comprises a polyolefin or a sealant. A top facial surface of Layer B is in adhering contact with a bottom facial surface of Layer A; a top facial surface of Layer C is in adhering contact with a bottom facial surface of Layer B; and at least one sealing region in which at least a portion of a top facial surface of Layer A is in adhering contact with at least one surface of the substrate to form a seal between the multilayer film and the substrate.

An eighteenth aspect of the present disclosure may include the seventeenth aspect, further comprising an unsealed region in which the top facial surface of Layer A is not adhered to the surface of the substrate, wherein the multilayer film and the substrate define a volume therebetween in the unsealed region.

A nineteenth aspect of the present disclosure may include the seventeenth of the eighteenth aspect, wherein Layer B is operable to cohesively fail in response to a force exerted on the multilayer film to separate the multilayer film from the substrate.

An twentieth aspect of the present disclosure may include the nineteenth aspect, wherein upon initial opening of the package, Layer B is operable to reclose the multilayer film to the substrate upon application of a reclose pressure to the multilayer film.

A twenty-first aspect of the present disclosure may include the seventeenth through the twentieth aspects, wherein the multilayer film comprises a tab in which the top facial surface of Layer A is not sealed to the substrate, wherein the tab is proximal to an outer edge of the multilayer film.

A twenty-second aspect of the present disclosure may include the seventeenth through twenty-first aspects, wherein, upon sealing the multilayer film to the substrate at a sealing temperature of from 100° C. to 180° C., the multilayer film exhibits an initial opening force of less than 40 N/inch and a reopen force of greater than or equal to 2.0 N/inch after at least 4 reclose cycles.

A twenty-third aspect of the present disclosure may include the seventeenth through twenty-second aspects, wherein the substrate comprises a flexible film.

A twenty-fourth aspect of the present disclosure may include the twenty-third aspect, wherein the flexible film comprises the multilayer film.

A twenty-fifth aspect of the present disclosure may include the seventeenth through twenty-second aspects, wherein the substrate comprises a rigid container.

A twenty-sixth aspect of the present disclosure may include the twenty-fifth aspect, wherein the rigid container comprises a tray.

A twenty-seventh aspect of the present disclosure may include the seventeenth through twenty-fourth aspects, wherein the package comprises a vertical form fill seal (VFFS) pouch package.

A twenty-eighth aspect of the present disclosure may include the seventeenth through twenty-fourth aspects, wherein the package comprises a stand-up pouch package.

A twenty-ninth aspect of the present disclosure may include the seventeenth through twenty-fourth aspects, wherein the package comprises a pillow pouch package.

A thirtieth aspect of the present disclosure may include the seventeenth through twenty-second aspects, wherein the package comprises a box that includes an opening, wherein the multilayer film is sealed to outer surfaces of the box proximal to and surrounding the perimeter of the opening.

A thirty-first aspect of present disclosure may include the seventeenth through thirtieth aspects, wherein the composition of Layer B exhibits an overall melt index of the composition of from 2 g/10 min to 15 g/10 min.

Throughout this disclosure ranges are provided for various properties of the adhesive composition, multilayer film, and packaging that include the adhesive composition or the multilayer film. It will be appreciated that when one or more explicit ranges are provided the individual values and the ranges formed therebetween are also intended to be provided, as providing an explicit listing of all possible combinations is prohibitive. For example, a provided range of 1-10 also includes the individual values, such as 1, 2, 3, 4.2, and 6.8, as well as all the ranges which may be formed within the provided bounds, such as 1-8, 2-4, 6-9, and 1.3-5.6.

It should now be understood that various aspects of the adhesive composition, multilayer film, and packaging including the adhesive composition or multilayer film are described and such aspects may be utilized in conjunction with various other aspects. It should also be understood to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

The invention claimed is:

1. A composition comprising:
(a) an ethylene/α-olefin random copolymer having density of 0.890 g/cm$^3$ or less, a melting point of 100° C. or less, and a melt index from 0.2 g/10 min to 8.0 g/10 min;
(b) a styrenic block copolymer comprising from greater than 1 wt % to less than 50 wt % units of styrene;
(c) a tackifier; and
(d) an oil,
wherein the composition exhibits an overall melt index of the composition of from 2 g/10 min to 15 g/10 min.

2. The composition of claim 1, wherein the composition comprises
(a) from 30 wt % to 65 wt % of the ethylene/α-olefin random copolymer;
(b) from 10 wt % to 35 wt % of the styrenic block copolymer;
(c) from 20 wt % to 40 wt % of the tackifier; and
(d) from greater than 0 wt % to 8 wt % of the oil.

3. The composition of claim 1, wherein the ethylene/α-olefin random copolymer has a melt index from 0.5 g/10 min to 1.5 g/10 min.

4. The composition of claim 1, wherein the ethylene/α-olefin random copolymer is an ethylene/octene copolymer.

5. The composition of claim 1, wherein the styrenic block copolymer is a styrene-isoprene-styrene block copolymer comprising from 15 wt % to 25 wt % styrene.

6. The composition of claim 1, wherein the tackifier is selected from the group consisting of a non-hydrogenated aliphatic $C_5$ resin and a hydrogenated aliphatic $C_5$ resin.

7. The composition of claim 1, wherein the composition has a density from 0.880 to 0.930 g/cm3.

8. The composition of claim 1, wherein, after subjecting the composition to a sealing temperature of from 100° C. to 180° C., the composition exhibits an initial internal cohesion force of less than or equal to 40 N/inch and a reclose cohesion force of greater than 2.0 N/inch after at least 4 reclose cycles.

9. The composition of claim 1, wherein the composition has a dynamic melt viscosity from 1000 Pa-s to 1400 Pa-s determined using DMS at a temperature of 190° C. and a frequency of 1 Hz.

10. The composition of claim 1, wherein the ethylene/α-olefin random copolymer comprises from 50 wt. % to 70 wt. % ethylene comonomer units.

11. A multilayer film comprising at least 3 layers, each having opposing facial surfaces, wherein:

a Layer A comprises a sealant layer;

a Layer B comprises the composition of claim 1, wherein a top facial surface of Layer B is in adhering contact with a bottom facial surface of Layer A; and a Layer C comprises a polyolefin, wherein a top facial surface of Layer C is in adhering contact with a bottom facial surface of Layer B.

12. The multilayer film of claim 11 further comprising one or more supplemental layers coupled to a bottom facial surface of Layer C.

13. An article comprising at least one component formed from the composition claim 1.

14. A package comprising:

a substrate;

a multilayer film comprising at least 3 layers, each layer having opposing facial surfaces, wherein:

a Layer A comprises a sealant layer;

a Layer B includes a composition comprising:

an ethylene/α-olefin random copolymer having a density less than or equal to 0.890 g/cm$^3$, a melting point of less than or equal to 100° C., and a melt index of from 0.2 g/10 min to 8.0 g/10 min;

a styrenic block copolymer comprising from greater than 1 wt. % to less than 50 wt. % units of styrene;

a tackifier; and an oil; and a Layer C comprises a polyolefin or a sealant, wherein:

a top facial surface of Layer B is in adhering contact with a bottom facial surface of Layer A;

a top facial surface of Layer C is in adhering contact with a bottom facial surface of Layer B; and at least one sealing region in which at least a portion of a top facial surface of Layer A is in adhering contact with at least one surface of the substrate to form a seal between the multilayer film and the substrate.

* * * * *